United States Patent [19]
Tanaka et al.

[11] Patent Number: 5,631,850

[45] Date of Patent: May 20, 1997

[54] AUDIO VISUAL EQUIPMENT WITH A DIGITAL BUS SYSTEM AND METHOD FOR INITIALIZING AND CONFIRMING CONNECTION

[75] Inventors: Shigeo Tanaka; Yasuo Kusagaya, both of Tokyo; Kenji Nakano, Kanagawa, all of Japan

[73] Assignee: Sony Corporation, Tokyo, Japan

[21] Appl. No.: 107,365

[22] Filed: Aug. 17, 1993

[30] Foreign Application Priority Data

Sep. 11, 1992 [JP] Japan .................................. 4-269385
Oct. 30, 1992 [JP] Japan .................................. 4-316304
Dec. 25, 1992 [JP] Japan .................................. 4-359059

[51] Int. Cl.⁶ .................................................. G01R 31/00
[52] U.S. Cl. ................... 364/551.01; 364/550; 371/22.1
[58] Field of Search .................................. 364/514, 140, 364/188, 514 B, 550, 551.01; 340/825.24; 455/6.3, 4.2; 360/33.1, 71, 92; 348/16, 552, 722; 371/23, 24

[56] References Cited

U.S. PATENT DOCUMENTS

| | | | |
|---|---|---|---|
| 4,808,992 | 2/1989 | Beyers et al. | 340/825.24 |
| 4,920,432 | 4/1990 | Eggers et al. | 364/514 |
| 5,204,662 | 4/1993 | Oda et al. | 340/825.24 |
| 5,321,846 | 6/1994 | Yokota et al. | 455/4.2 |
| 5,389,963 | 2/1995 | Lepley et al. | 455/4.2 |

*Primary Examiner*—Emanuel T. Voeltz
*Assistant Examiner*—Thomas Peeso
*Attorney, Agent, or Firm*—Jay H. Maioli

[57] ABSTRACT

When trying to make a correct connection, a VCR 13, which should be connected to terminal 15, is connected instead to terminal 16 by mistake, so that a signal generator 13a constructed internally within the VCR 13 outputs a test signal, but the switcher 8 selects the signal being input at terminal 15 (where there is no signal present), and provides it to detector 12, but as there is no signal at terminal 15, the CPU 5 determines that the connection is incorrect and displays a user prompt to this effect on the CRT 10.

18 Claims, 31 Drawing Sheets

Fig.9
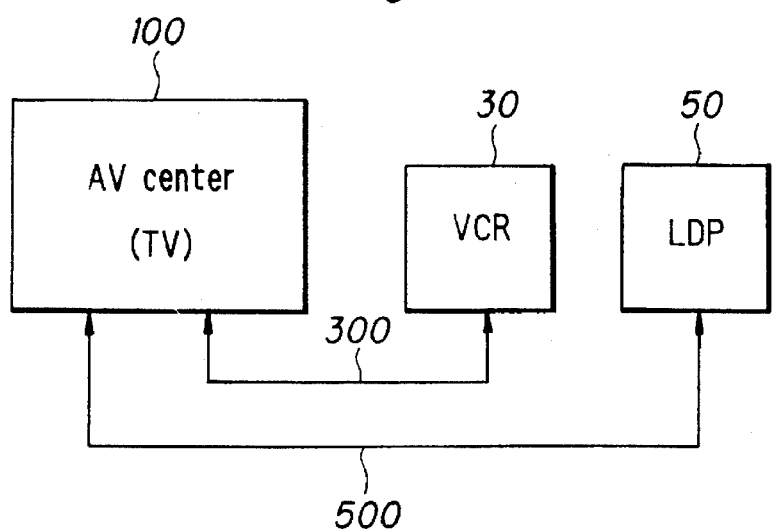
Fig.10
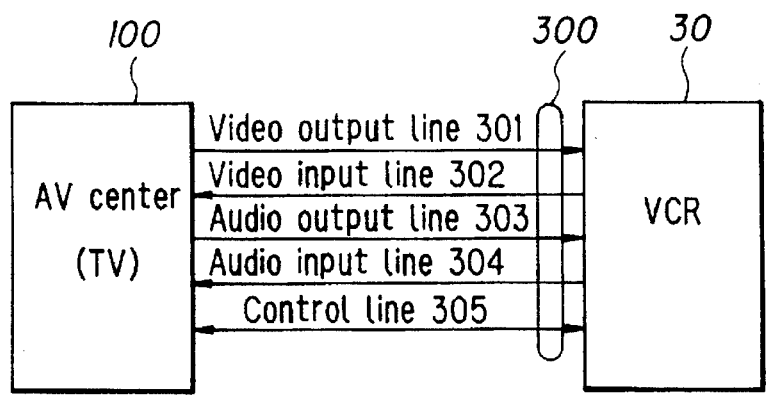
Fig.11
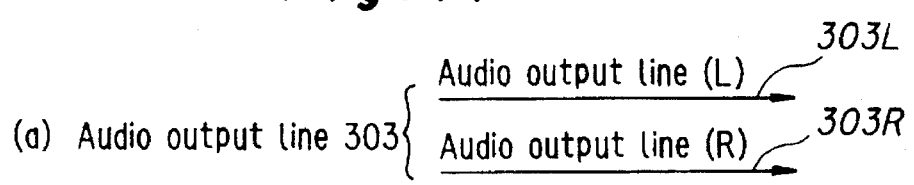
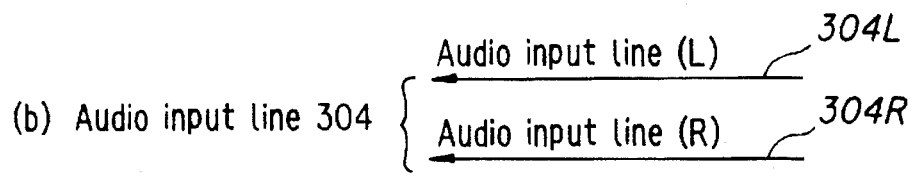

Fig. 26

(a)
```
1CH    AAA
2CH    BBB        ─── 113
3CH    CCC
4CH    DDD
```

(b)
contrast  ▭
brightness ▭
color     ▭

(c)
External audio/video equipment 1 : RGB ; digital audio ; terminal P1
External audio/video equipment 2 : Y/C ; analogue audio ; terminal P2

(d)
Opposing equipment set up process menu
CH setting 1 : same as CH setting for TV
         2 : normal setting
Picture quality setting 1 : normal
                       2 : enhance

Fig.30

| Transmission source | Receiving destination |
|---|---|
| Laser disc player | VCR(VHS) |
| VCR(VHS) | 8 milli video |
| 8 milli video | VCR(Beta) |
| VCR(Beta) | |

| Transmission source | Receiving destination |
|---|---|
| Laser disc player ⟹ | VCR(VHS) |
| VCR(VHS) | 8 milli video |
| 8 milli video | VCR(Beta) |
| VCR(Beta) | |

~10

(Conventional method)

(Conventional method)

AUDIO VISUAL EQUIPMENT WITH A DIGITAL BUS SYSTEM AND METHOD FOR INITIALIZING AND CONFIRMING CONNECTION

BACKGROUND OF THE INVENTION

1. Field of the Invention

The present invention relates to controlling the output of picture signals and audio signals from equipment such as, for example, video tape recorders, laser disc players and digital audio tape machines in audio visual systems with suitable connection control equipment, initialization equipment and a suitable connection confirmation method.

2. Description of the Related Art

FIG. 33 is a block diagram showing an example structure of a prior art video system. The television 100 selects an object channel from the high frequency signal provided by the antenna by using the internally constructed tuner. This is then demodulated so that the picture signal and audio signal can be picked out and then output via, for example, a CRT and a speaker (both not shown in the diagram). The video cassette recorder (VCR) 30 and the laser disc player 50 which are connected in parallel with the television 100 via the external input terminals 25 and 26 are then selected to play pictures and audio as deemed necessary, with these pictures and audio then being supplied to the CRT and speaker. In addition to the external output terminals (not shown in the diagram) for the VCR 30 and laser disc player 50 both being connected in parallel with the external input terminals 25 and 26 for the television 100, their control terminals (not shown in the diagram) are also connected in series with the control signal terminal 24 for the television. Operations such as, for example, the turning on and off and the playing of pictures and audio from the VCR 30 and the laser disc player 50 can then be controlled by operating the operating panel for the VCR 30 and the laser disc 50 or by operating their exclusive remote controllers (not shown in the diagram).

As well as a remote controller for the television 100 there is also a remote controller for the VCR 30 and the laser disc player 50 giving a total of three remote controllers in all which have to be operated. As this makes the overall operation complicated, in the video system in FIG. 33 the control signal output from the remote controller 2 is supplied via the control signal terminal 24 so that both the VCR 30 and the laser disc player 50 can be controlled. Also, in the prior art, when making a connection with an object item of audio visual equipment in accordance with the D2B (audio/video bus protocol) standard, a trial and error connection process is used which runs through the various possible connection paths.

For example, in the conventional audio visual system shown in FIG. 34, when making a signal connection from the television 100 to the VCR 30, it is first confirmed if the path passing through the first audio/video switching controller is a possibility, and if it is, a connection instruction is output to the VCR 30 via the first audio/video switching controller 21.

However, if the first audio/video switching controller 21 is being used by the laser disc player 50, after it has been confirmed that a path through the first audio/video switching controller 21 is not possible, it is confirmed whether or not a path through the second audio/video switching controller 22 is possible. If it is possible, a connection instruction is output to the VCR 30 via the second audio/video switching controller 22 and a connection is executed by this path.

In the prior art example in FIG. 33, the VCR 30 and the laser disc player 50 are connected in parallel to the external input terminals 25 and 26 and are also connected in serial to the control signal terminal 24. After these connections have been carried out, an initialization process has to be carried out so that the television 100 can recognize the equipment connected at the external input terminals 25 and 26 (i.e. the VCR 30 and the laser disc player 50). It will then be possible to control (operate) the television 100, VCR 30 and the laser disc player 50 using the remote controller 2.

So, with the conventional television shown in FIG. 33, during initialization, if it cannot be confirmed that the VCR 30 and the laser disc player 50 are connected to the television 100 then it is likely that they are connected the wrong way around (as indicated by the dotted lines in the diagram). In order to then initialize the VCR 30 and the laser disc player 50 connected to the external input terminals 26 and 25, the user will first have to put the cables the right way around, which provides troublesome work for the user.

Herein, the present applicant put forward an application for a picture control apparatus where a picture for use in connection confirmation was put on one part of a CRT screen, with pictures being played from the apparatus connected to the external input terminals 25 and 26 then displayed so that confirmation of the connection conditions could be made (Japanese Patent Application No. Hei. 4-300391 [Picture Control Equipment, Electrical Appliance Control Equipment and Address Confirmation Method]).

However, this kind of picture control equipment was of no use, as a recording medium with a picture signal recorded on it had to be set up at the equipment connected to the external input terminals 25 and 26.

Also, in the connection control method used with the conventional audio/video system in FIG. 34, there was a problem whereby a long period of time elapses between the user operating the remote controller to output a signal connection instruction to the object audio visual equipment and the connection actually being set up.

SUMMARY OF THE INVENTION

As the present invention sets out to solve the kind of problems put forward in the prior art, it is a first object of this invention that correct connections within an audio visual system can be carried out in an easy manner so that anxiety is not experienced by the user. Also, it is a second object of this invention that the procedure for connecting other electronic equipment can be easily understood and that the initial arrangement of connections for a large number of items of electrical equipment can be carried out easily.

Further, it is a third object of this invention that connection confirmation for electrical equipment can be carried out at a low cost.

In addition, it is a fourth object of this invention that for the case where there is a plurality of connection paths to predetermined equipment, connection control equipment is provided where the time taken to complete connections to the predetermined equipment is short. According to the present invention, there is provided an audio visual equipment with a digital bus system comprising: a CPU for outputting a control signal; controlling means for controlling one or more external apparatuses based on the control signal from the CPU; switching means for selecting one of the external apparatuses in order to receive an information signal from the selected external apparatus; detecting means for detecting the information signal received by the switching means; displaying means for displaying the information signal received by the switching means; with the control means and the switching means being controlled by the CPU.

According to the present invention, there is also provided a method for initializing and confirming connection of a system comprising the steps of: showing a system connection and/or configuration model to the user; generating a test signal for confirming the model; and detecting the test signal.

According to the present invention, there is further provided a method for initializing a system, comprising the steps of: sending a predetermined command via a digital bus line; going through predetermined processing steps for deciding a system status; and storing a system configuration in a non-volatile storage means.

BRIEF DESCRIPTION OF THE DRAWINGS

FIG. 9 is a block diagram of the embodiment where the audio/video line and the D2B control line have been lumped together and where each item of audio/video equipment is connected outward from the television 100 which is at the center;

FIG. 10 is a view of an example structure for the connector cable 300 where the audio/video line and the D2B control line have been lumped together;

FIGS. 11a and 11b are views of an example of the structure of the audio output line 303 and the audio input line 304 for the case where the audio signal is made up of distinct left and right signals;

FIGS. 26a through 26d are views of what is displayed on the CRT at each step of the process in FIG. 25;

FIG. 30 is a view of an example of what is first displayed on the CRT in the connection set up process in FIG. 32;

FIG. 31 a view of an example of what is displayed on the CRT when the connection route is set up for the connection set up process in FIG. 32;

DETAILED DESCRIPTION OF THE PREFERRED EMBODIMENTS

First Embodiment

Figure 1:
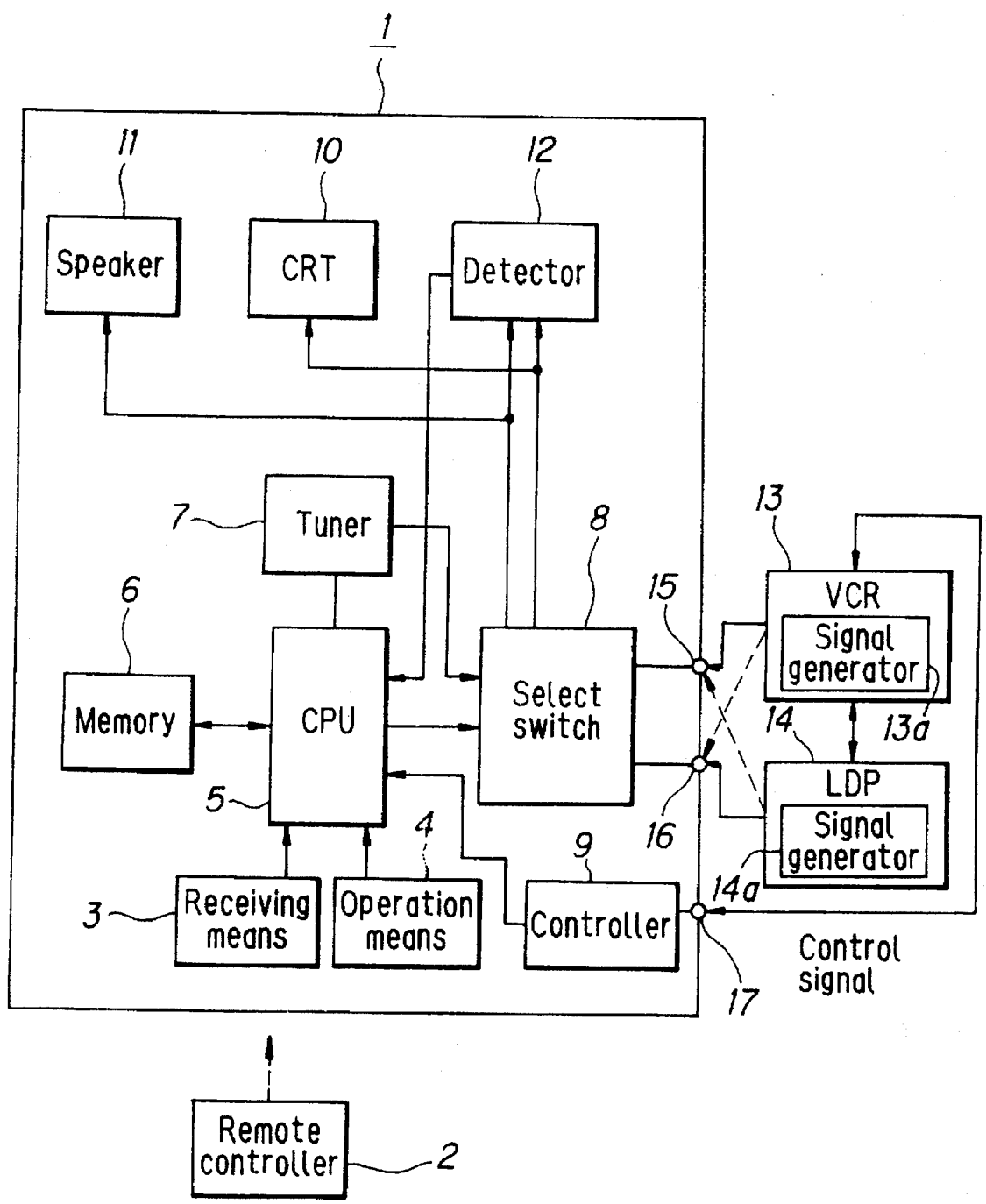
FIG. 1 is a block diagram of the structure of a first embodiment of a connection control apparatus for a video system for this invention.

FIG. 1 is a block diagram of the structure of a first embodiment of a connection control apparatus for a video system for this invention. The remote controller 2 will, for example, have switches for the following five operations. (1) An on/off switch for turning the television on and off. (2) Channel buttons, for selecting the desired channels. (3) A volume adjuster for adjusting the volume output from the speakers. (4) A selector switch for selecting which of the signals from; the picture and audio signal output from the tuner; the signal input at the external input terminal 15; and the signal input at the external input terminal 16; should be output to the CRT 10 and the speaker 11. (5) A control switch for controlling apparatus connected to the external input terminals 15 and 16.

When a switch is pressed on the remote controller, its internal optical generator will generate infra-red light corresponding to that particular switch. The optical receiver 3 will then convert that light into an electrical signal and send it to the CPU 5. The operation section 4 then has the same kind of switches as the remote controller 2, which are operated when the television 1 is to be turned on and off or is to have a channel selected or when apparatus connected to external input terminal 15 or 16 is to be controlled.

The controller 9 is connected in series with the VCR 13 and the laser disc player 14 via the control signal terminal 17. When a corresponding operation of the remote controller 2 or the operation section 4 occurs, the controlling of operations such as the turning on and off of the VCR 13 and the laser disc player 14 or the playback of the picture and sound can then be controlled. The controller 9 also controls the signal generators 13a and 14a which are constructed internally within the apparatus (i.e. the VCR 13 and the laser disc player 14 in FIG. 1) connected to the external input terminals 15 and 16 of the television 1. When initializing in order to enable the CPU 5 within the television 1 to discriminate (recognize) between the apparatus connected to the external input terminals 15 and 16, a picture test signal such as, for example, a color bar, (a picture confirmation test signal) is sent to the external input terminal 15 or 16, along with an audio test signal (test signal to confirm the audio) such as, for example, a 1 kHz, 0 dB sine wave (Hereinafter referred to as a 1 k sinewave).

The switcher 8, under the control of the CPU 5, selects one of: the picture signal and audio signal output from the tuner 7; the picture signal and/or the audio signal provided at the external input terminal 15 (the picture signal and the audio signal output from the VCR 13 in FIG. 1); or the picture signal and/or the audio signal provided at the external input terminal 16 (the picture signal and the audio signal output from the laser disc player 14 in the embodiment shown in FIG. 1), for sending to the CRT 10 and the speaker 11. Moreover, for the case where there is an initialization to discriminate (recognize) between the apparatus connected at the external input terminals 15 and 16, the selector 8 selects one from the color bar and sine output from the internally constructed signal generator 13a for the apparatus connected to the external input terminal 15 (the VCR 13), and the internally constructed signal generator 14a for the apparatus connected to the external input terminal 16 (the laser disc player 14), for supplying to the detector 12. The detector 12 then outputs the results of the detection of the color bar and the 1 k sine wave provided by the selector 8 to the CPU 5.

The memory 6, for the case where there is an initialization to discriminate (recognize) between the apparatus connected at the external input terminals 15 and 16, contains information for the CPU 5 inside the television 1 concerning recommendations for the user to be displayed on the CRT 10 about how the apparatus connected to the external input terminals 15 and 16 should be connected to the television 1. These recommendations are known as connection diagrams (connection models). User prompts concerning explanations of the operation of the remote controller 2 and the operation section 4, or confirmation of the way in which the VCR 13 or the laser disc player 14 are connected to the external output terminal 15 or 16 are also held within this memory 6.

When the remote controller 2 or the operation section 4 is not being operated, the CPU provides the control necessary for the memory 6, the tuner 7, the selector 8 and the controller 9. Moreover, the CPU reads out a message or a connection diagram from the memory 6 which corresponds with the selection results of the color bar and or the 1 k sine wave supplied by the detector 12 and sends it to the CRT via the selector 8.

The tuner 7 picks out the audio and picture signal for the selected channel from the high frequency signal supplied by the antenna (not shown in the diagram) and supplies it to the switcher 8.

The CRT 10 does not just show the picture corresponding to the picture signal output from the selector 8, but also displays pictures or messages read from the memory 6 by the CPU 5. The speaker 11 then converts the audio signal into an audible audio output.

Next, the operation of the embodiment shown in FIG. 1 will be described. In normal mode operation, an operation of the remote controller 2 or the operation section 4 will cause the switcher 8 to be selected accordingly to one of the following: the picture signal and audio signal output by the tuner; the picture signal and/or audio signal provided at the external input terminal 15; or the picture signal and/or audio signal provided at the external input terminal 16. The picture signal and audio signal selected are then sent to the CRT 10 and the speaker 11. The CRT 10 then displays a picture produced from the picture signal and the speaker 11 then outputs sound produced from the audio signal.

In the case of initialization, first of all, after the VCR 13 and the laser disc player 14 have been connected to the external input terminals 15 and 16 for the television 1, initialization mode is selected as the operating mode of the television 1 by operating the remote controller 2 or the operation section 4. By setting the operating mode of the television 1 to initialization mode, a sample connection diagram showing how apparatus which is capable of being connected to the television 1 can be connected to the television is read from the memory 6 by the CPU 5. This connection diagram is then sent to the CRT 10 via the switcher 8, where it is then displayed. At this time, by operating the remote controller 2 or the operation section 4, the user can select the preferred connection diagram, modify the sample connection diagram to a desired preference, or make a new more desirable connection diagram.

Here, if the remote controller is operated, its internally constructed optical generator will generate light corresponding to that operation. This infra-red light is then received by the optical receiver, converted into an electrical signal, and sent to the CPU 5. If the operating means is operated, an electrical signal corresponding to the operation is sent to the CPU 5.

In this way, by operating the remote controller 2 or the operation section 4, the user can select the preferred connection diagram, modify the sample connection diagram to a desired preference, or make a new more desirable connection diagram. In doing this, the CPU 5 selects the signal input at the external input terminal 15 and in sending this signal to the detector circuit, a control signal corresponding to the switcher 8 is also output. Moreover, control can be carried out by having the apparatus connected to the external output terminal 15, namely, the VCR 13, output a color bar and/or a 1 k sinewave from its internal signal generator and by having the controller 9 output a control signal.

In doing so, the selector 8, in response to a control signal output from the CPU 5, selects the signal being input at the external input terminal 15, namely the color bar and/or the 1 k sine wave being output by the signal generator 13a and sends it to the detector 12. At the same time, the controller 9 will send out a control signal via the control signal terminal 17 to the signal generator 13a in response to a control signal output from the CPU 5. This will tell the signal generator constructed within the VCR 13 to start sending out a color bar and/or a 1 k sine wave.

The detector 12 detects the color bar and/or the 1 k sine wave supplied by the switcher 8 and outputs the results to the CPU 5. For the case where the CPU 5 determines from the detection results output from the detector 12 that the apparatus inside which the signal generator 13a currently outputting the color bar and/or the 1 k sinewave is located, i.e. the VCR 13, is connected in the correct manner (i.e. the VCR 13 is connected to the external input terminal 15), the output from the signal generator 13a constructed internally within the VCR 13 is made to stop. This is to say that the C.P.U 5 will output a control signal to the controller 9. The controller 9 will then send an output via the control signal terminal 17 to the signal generator 13a constructed within the VCR 13 to stop the outputting of the color bar and/or the 1 k sinewave.. In this way the output of the color bar and/or the 1 k sine wave from the signal generator 13a will be stopped.

For the case where the VCR 13 is not connected to the external input terminal 15, i.e. when it is connected to external input terminal 16 (shown by the dotted line in the diagram), a color bar and/or a 1 k sine wave is still sent out by the signal generator 13a constructed within the VCR 13. The switcher 8 then selects the signal being input at external input terminal 15. However, as no color bar and/or 1 k sine wave is being input at external input terminal 15, no signal is sent to the detector 12. Since there is then no signal output from the detector 12 the CPU determines that the present connection situation is unsuitable. In this case, the CPU 5 senses that the connection shown by the dotted lines in the diagram is in an unsuitable place. It then reads a user prompt relating to the connection from the memory 6 and sends it to the CRT 10 via the switcher 8. The CRT 10 then displays a prompt provided by the CPU 5 to the user to the effect that the position of the connection is unsuitable.

Whether or not the VCR 13 is connected to the external input terminal 15 can then be discerned from the prompts concerning the suitability of the connections displayed on the CRT 10.

Once it has been confirmed (recognized) that the VCR 13 is connected correctly (i.e. that the VCR 13 is connected to the external input terminal 15), the CPU selects the signal being input at external input terminal 16. A control signal is then sent to the switcher 8 in order to output this signal to the detector 12. The CPU 5 then sends a control signal out via the controller 9 to the apparatus (believed) connected to the external input terminal 16 (i.e. to the signal generator 14a constructed within the L.D.P. 14) so as to have a color bar and/or a 1 k sinewave outputted.

In doing so, the selector 8, under the guidance of the control signal output from the CPU 5, selects the signal being input at the external input terminal 16, namely the color bar and/or the 1 k sine wave being output by the signal generator 14a and sends it to the detector 12. At the same time, the controller 9 will send out a control signal via the control signal terminal 17 to the signal generator 14a in response to a control signal output from the CPU 5. This will tell the signal generator constructed within the laser disc player 14 to start sending out a color bar and/or a 1 k sine wave.

The detector 12 detects the color bar and/or the 1 k sine wave supplied by the switcher 8 and outputs the results to the CPU 5. For the case where the CPU 5 determines from the detection results output from the detector 12 that the apparatus inside which the signal generator 14a currently outputting the color bar and/or the 1 k sinewave is located, i.e. the laser disc player 14, is connected in the correct manner (i.e. the laser disc player 14 is connected to the external input terminal 16), the output from the signal generator 14a constructed internally within the VCR 14 is made to stop. This is to say that the CPU 5 will output a control signal to the controller 9. The controller 9 will then send an output via the control signal terminal 17 to the signal generator 14a constructed within the laser disc player 14 to stop the outputting of the color bar and/or the 1 k sinewave. In this way the output of the color bar and/or the 1 k sine wave from the signal generator 14a will be stopped.

Next, the case where the laser disc player 14 is not connected to the external input terminal 16, i.e. when it is connected to external input terminal 15 (shown by the dotted line in the diagram) will be considered. Here, the switcher 8 selects the signal being input at external input terminal 16 and sends it to the detector 12. It follows that the CPU 5 will discern that the connection is unsuitable because since no color bar and/or 1 k sine wave is being input at external input terminal 16, no color bar signal or 1 k sine wave will be detected by the detector 12 as having been output by the signal generator constructed internally within the laser disc player 14. In this case, the CPU 5 senses that the connection shown by the dotted lines in the diagram is in an unsuitable place. It then reads a user prompt relating to the connection from the memory 6 and sends it to the CRT 10 via the switcher 8. The CRT 10 then displays a prompt provided by the CPU 5 to the user to the effect that the position of the connection is unsuitable.

Whether or not the laser disc player 14 is connected to the external input terminal 16 can then be discerned from the prompts concerning the suitability of the connections displayed on the CRT 10.

Figure 2:
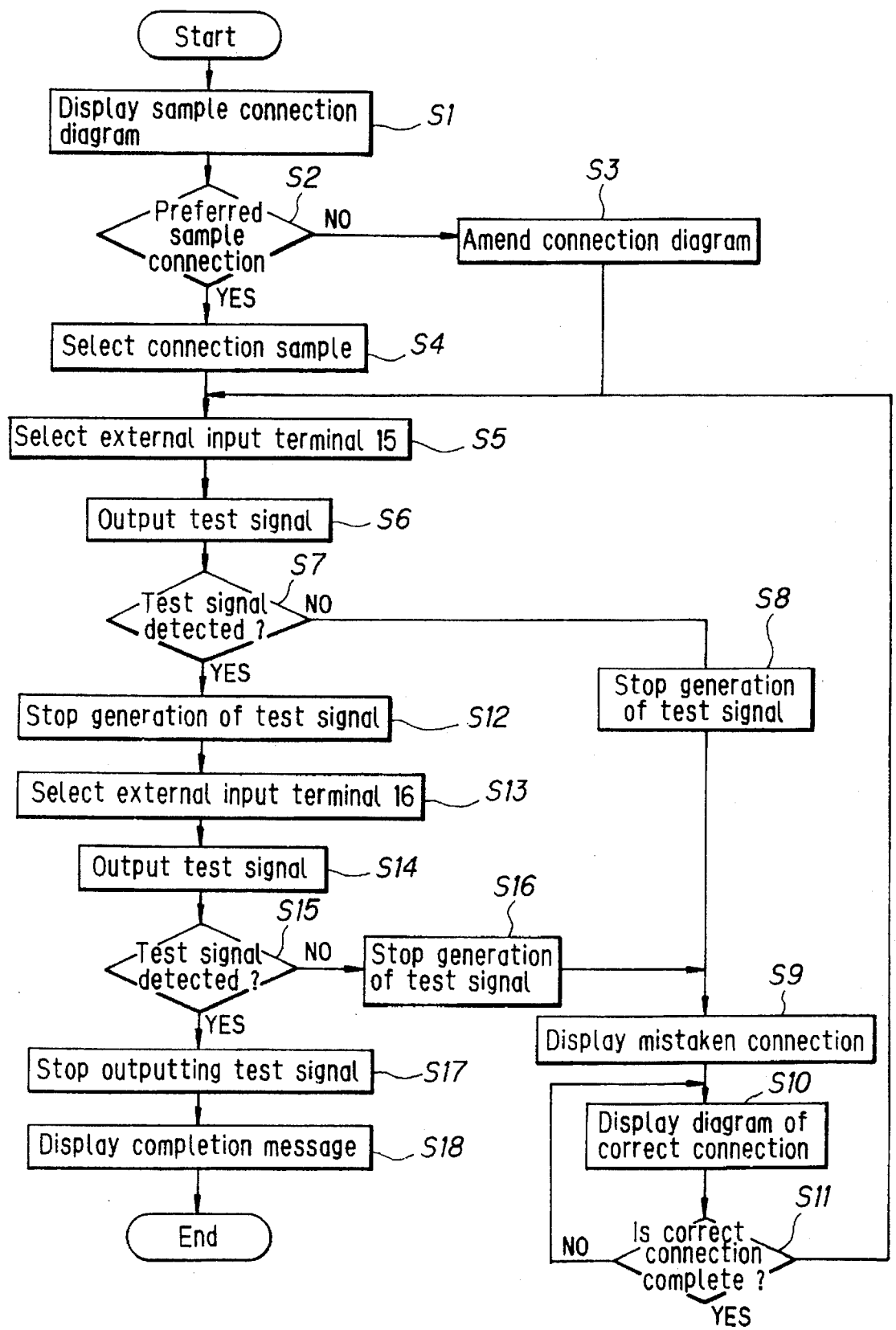
FIG. 2 is a view of a flowchart describing the operation of the embodiment in FIG. 1.

Next, the operation will be described with reference to the flowchart in FIG. 2. First, in step S1, a sample connection diagram (connection model) of how to connect connectable apparatus to the television 1 is shown on the CRT 10 then in step S2 it is determined whether or not the sample is preferred by the user. If, in step S2, the sample is not the user's preference, step S3 is proceeded to so that the user can modify the sample or create a new connection diagram before going on to step S5. If it is determined in step S2 that the sample is to the users preference, the sample is selected in step S4 before proceeding to step 5.

In step S5, the signal being input to the external input terminal 15 is selected. In step S6, the signal generator 13a constructed within the VCR 13 believed to be connected to the external input terminal 15 which was selected in step S5 is made to start outputting a color bar and/or a 1 k sinewave. Step S7 is then proceeded to where it is determined whether or not the color bar and/or the 1 k sinewave (test signal) can be detected by the detector 12. In step S7, if it is determined that the color bar and/or the 1 k sinewave (test signal) cannot be detected by the detector 12, i.e. that the VCR 13 is not connected to the external input terminal 15, step S8 is proceeded to. Here, the output of the color bar and/or the 1 k sine wave (test signal) from the signal generator constructed within the VCR 13 thought to be connected to the external input terminal 15 is made to stop before proceeding to step S9.

In step 9, the incorrectly connected section is shown on the CRT 10. In step 10, a correct connection diagram is displayed on the CRT as a prompt for confirmation of connection from the user. This connection diagram can be a connection map which was modified or made in step S3, or a connection map selected in step S4. In step S11 it is then determined whether or not the user has corrected the connections (i.e. rectified the connections indicated on the CRT 10 in step S9 as being at fault). If it is determined in step S11 that these connections have not been rectified by the user then step S10 is returned to. The process then repeatedly cycles through step S10 and step S11 until the connections have been rectified.

In step S11, if it is determined that the user has confirmed the correct connection, step S5 is returned to and the process is repeated between step S5 and step S11 until a color bar or a 1 k sinewave (test signal) can be detected by the detector 12.

In step S7, if it is determined that a color bar or a 1 k sinewave (test signal) can be detected by the detector 12, step S12 is proceeded to and the output of the color bar and/or the 1 k sine wave (test signal) from the signal generator 13a constructed within the VCR 13 which is connected to the external input terminal 15 is stopped before proceeding to step S13.

In step S13, the signal being input to the external input terminal 16 is selected. In step S14, the signal generator 14a constructed within the laser disc player 14 believed to be connected to the external input terminal 16 which was selected in step S13 is made to start outputting a color bar and/or a 1 k sinewave. Step S15 is then proceeded to where it is determined whether or not the color bar and/or the 1 k sinewave (test signal) can be detected by the detector 12. In step 15, if it is determined that the color bar and/or the 1 k sinewave (test signal) cannot be detected by the detector 12, i.e. that the laser disc player 14 is not connected to the external input terminal 16, step S16 is proceeded to. Here, the output of the color bar and/or the 1 k sine wave (test signal) from the signal generator constructed within the laser disc player 14 thought to be connected to the external input terminal 16 is made to stop before proceeding to step S9. After this, the process goes between step S10 and step S11 in the same manner as described previously until step 5 is returned to. This process is repeated between step S5 and step S16 until a color bar or a 1 k sinewave (test signal) is detected by the detector 12 in step S7 and step S15.

If it is determined that the detector 12 can detect a color bar and a 1 k sinewave (test signal) in step S7 or step S15, the process goes to step S17. The outputting of a color bar or a 1 k sinewave (test signal) from the internal signal generator of the laser disc player 14 connected to the external input terminal 16 is made to stop before progressing to step 18. A message to let the user know that the connections have been set up along the lines of the modified or newly made connection diagram from step S3 or the connection diagram selected in step 4 is then displayed on the CRT in step 18 and the process is finished.

In this embodiment, a VCR 13 and a laser disc player 14 which are capable of outputting both audio and picture signals are connected to the external input terminals 15 and 16. However, apparatus such as, for example, digital audio tape machines which are capable of outputting only audio could be connected to the external input terminals 15 and 16 of the television 1. Also, in this embodiment, the tuner 7 is constructed inside the television 1 although this kind of tuner 7 does not have to be constructed internally within the television 1. The tuner 7 could be also be constructed internally in the same way as the signal generators 13a and 14a are constructed internally within the VCR 13 and the laser disc player 14, or the system could be set up so that the tuner 7 is constructed as a stand alone piece of apparatus connected to the external input terminal 15 and/or 16 of the television 1.

Second Embodiment

Figure 3:
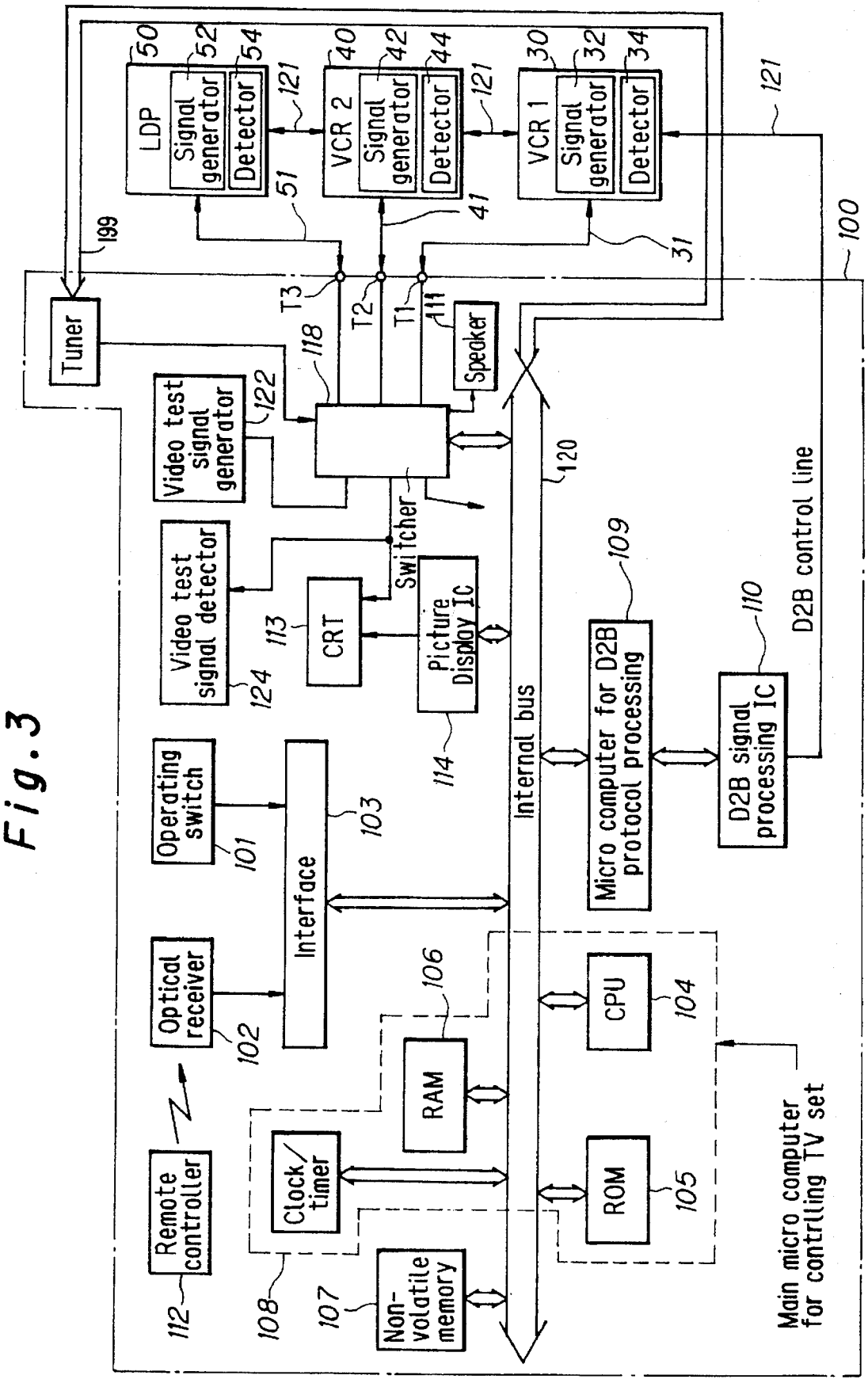
FIG. 3 is a block diagram of the construction of a second embodiment of the present invention suitable for use with an audio-visual system.

FIG. 3 is a block diagram of the construction of a preferred embodiment suitable for use with the audio-visual system of the present invention. Here, if the operating switch 101 is operated, a predetermined instruction is input into the CPU 104 via the interface 103. Also, in the same way, if the remote controller 112 is operated it sends out infra-red light to be received by the optical receiver 102. The result of this also causes a predetermined instruction to be sent by the optical receiver 102 via the interface 103 to be input into the CPU 104. The CPU then processes the inputted instruction and outputs an instruction such as a station select instruction for the tuner or an instruction for the D2B communications processing microcomputer to be described later.

The ROM 105 contains the program and data essential for the operation of the CPU 104. The RAM 106 is for storing data such as results obtained from processing. The non-volatile memory 107 is for storing data which it is essential to retain even after the power has been turned off, such as, for example, information regarding connection with other audio visual equipment (i.e. the VCRs 30 and 40, and the laser disc player 50). The clock timer then generates the computer clock information around which the overall operation timing will be based.

The CPU 104, ROM 105, RAM 106 and the clock timer 108 make up the main microcomputer for controlling the television (hereinafter referred to as the "TV microcomputer").

The D2B protocol communications processing microcomputer 109 having RAMS and ROMS and the like internally constructed for its own exclusive use (hereinafter referred to as the D2B communications processing microcomputer) is connected to the picture display IC 114 and the switcher 118 via the internal bus 120 derived from the I2C bus (i.e. the so called Domestic Digital Bus). It is also serially connected for the sending and receiving of commands to other equipment such as the first VCR 30, the second VCR 40 and the laser disc player 50 via the D2B communications processing IC 110 and the D2B control line 121.

The first VCR 30 is connected to the terminal T1 of the switcher 118 via the audio visual signal line 31 in such a way that audio and video signals can be passed between it and the switcher 118. The second VCR 40 is then connected to the terminal T2 of the switcher 118 via the audio visual signal line 41 in such a way that audio and video signals can be passed between it and the switcher 118. The laser disc player 50 is then also connected to the terminal T3 of the switcher 118 via the audio visual signal line 51 in such a way that audio and video signals can be passed between it and the switcher 118.

The video test signal generator 122 provides a video test signal to the switcher 118. The video test signal detector 124 then detects the video test signal outputted from the switcher 118. The VCR 30, VCR 40 and the laser disc player 50 have a video test signal generator 32 and a video test signal detector 34, a video test signal generator 42 and a video test signal detector 44, and a video test signal generator 52 and a video test signal detector 54, respectively.

The switcher 118, under the control of the CPU 104 or the D2B communications processing microcomputer 109, selects one of the video signals ( making up the video test signal) being output from either the tuner 199, the first VCR 30, the second VCR 40 or the laser disc player 50 and supplies it to the CRT 113 and the video test signal detector 124.

Also, the switcher 118, under the control of the CPU 104, supplies one of either the video signal (or audio signal) outputted from the tuner 199 or the video signal output from the video test signal generator 122 to the first VCR 30, the second VCR 40 or the laser disc player 50.

The CRT 113 then displays the video signal output from the switcher 118. The CRT 113 also displays necessary information supplied from the internal bus 120 via the picture display IC 114. The audio signal output from the switcher 118 is then played through the speaker 111.

In FIG. 3, the operating switch 101, the optical receiver 102, the interface 103, the CPU 104, the ROM 105, the RAM 106, the non-volatile memory 107, the clock timer 108, the D2B communications processing microcomputer 109, the D2B communications processing IC 110, the CRT 113, the picture display IC 114, the switcher 118, the video test signal generator 122, the video test signal detector 124, the tuner 199 and the speaker 111 make up the audio visual center, that is to say, the television 100.

The D2B communications processing microcomputer 109 and the D2B communications processing IC 110 are also essential elements in the organization of the first VCR 30, the second VCR 40 and the laser disc player 50.

Figure 4:
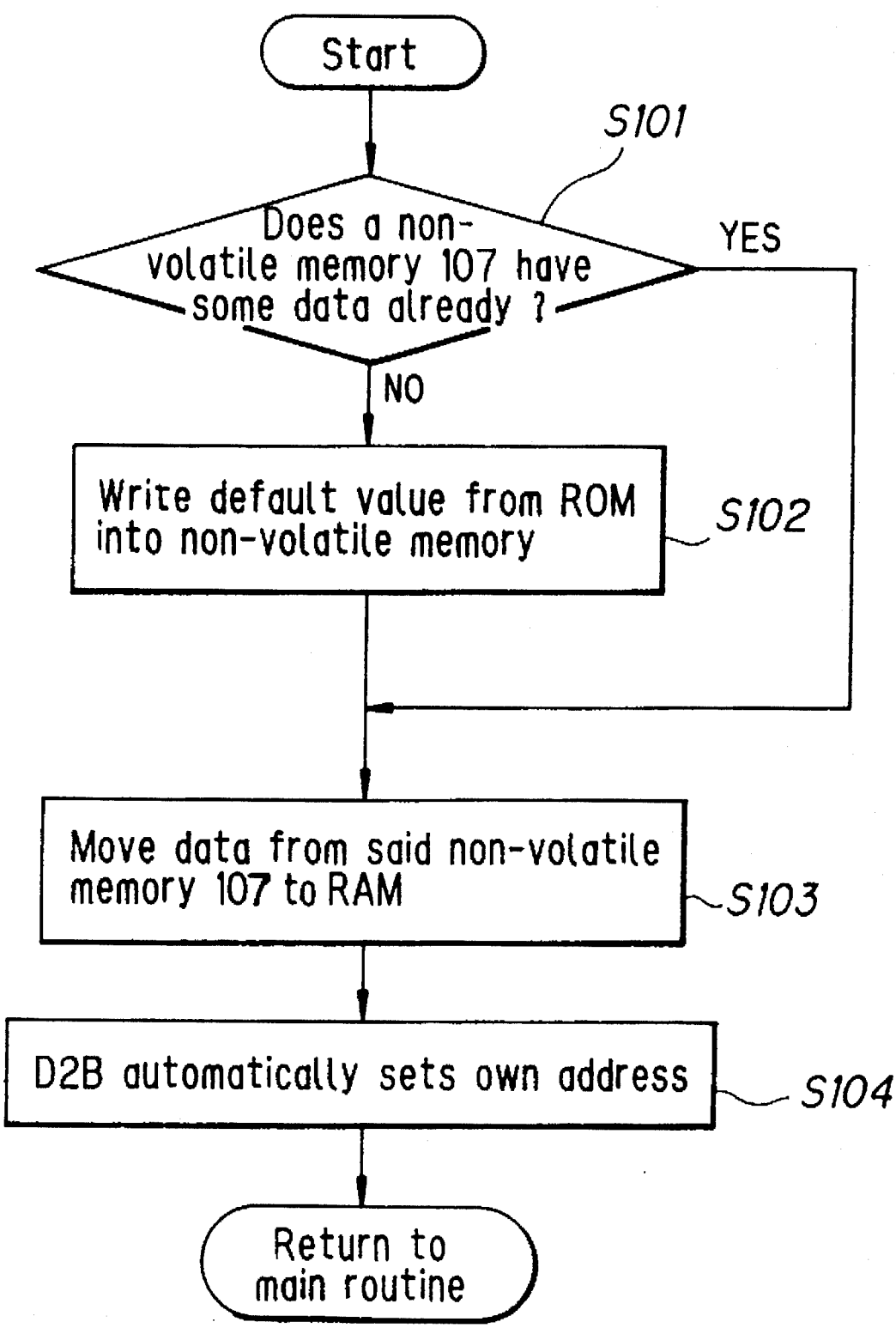
FIG. 4 is a view of a flowchart showing the process for the non-volatile memory 107 when the power is turned on for the embodiment in FIG. 3.

FIG. 4 is a view of the process corresponding to the non-volatile memory 107 when the power is turned on for the embodiment in FIG. 3. When the power is turned on, the D2B communications processing microcomputer 109 checks for data in the non-volatile memory 107 (step S101). If no data is written in, a default amount (initializing amount) which is read out of the ROM contained within the microcomputer 109 is written into the non-volatile memory 107 (step 102). The following methods could be used to determine whether or not there is anything written into the non-volatile memory 107. The specific contents of the non-volatile memory 107 could be compared with other data, a specific region of the data held within the non-volatile memory could be compared, or a workshop setting, user setting, or default input could be pre-written into the non-volatile memory 107 along with display information indicating that this has been carried out.

Figure 5:
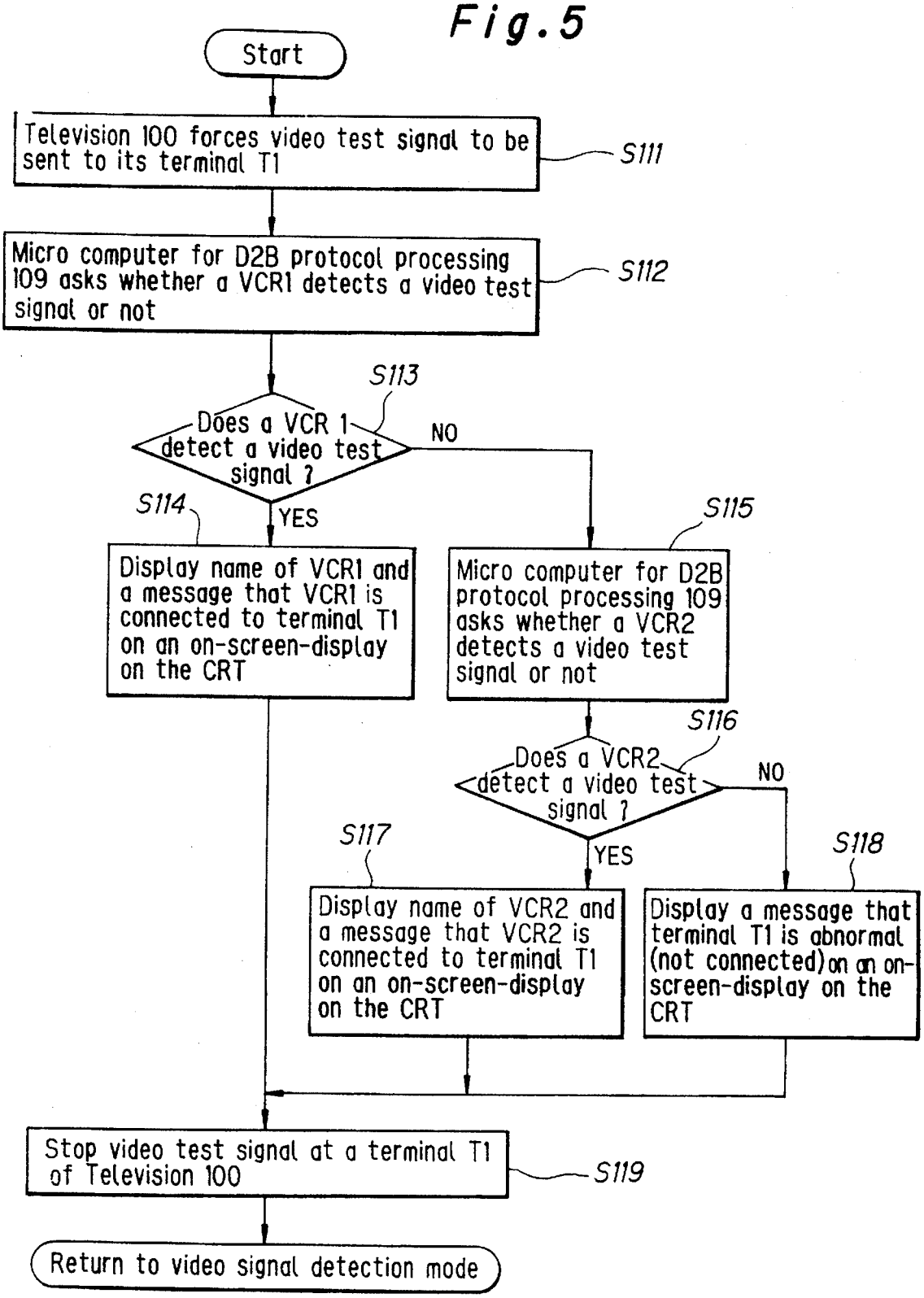
FIG. 5 shows a first portion of a flowchart showing an example of the connection setting initialization operation for the embodiment in FIG. 3.
Figure 6:
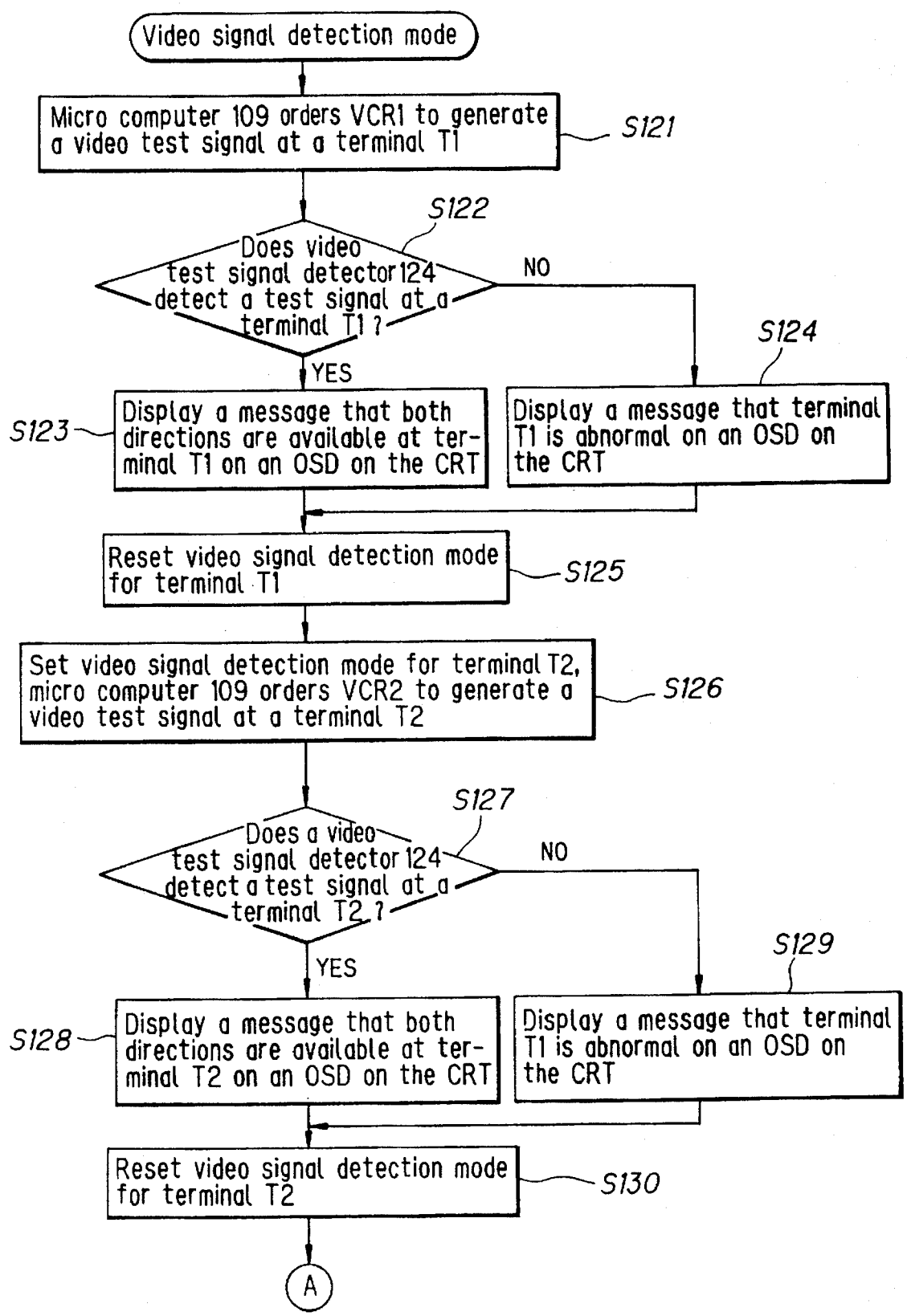
FIG. 6 shows a second portion of a flowchart showing an example of the connection setting initialization operation for the embodiment in FIG. 3.
Figure 7:
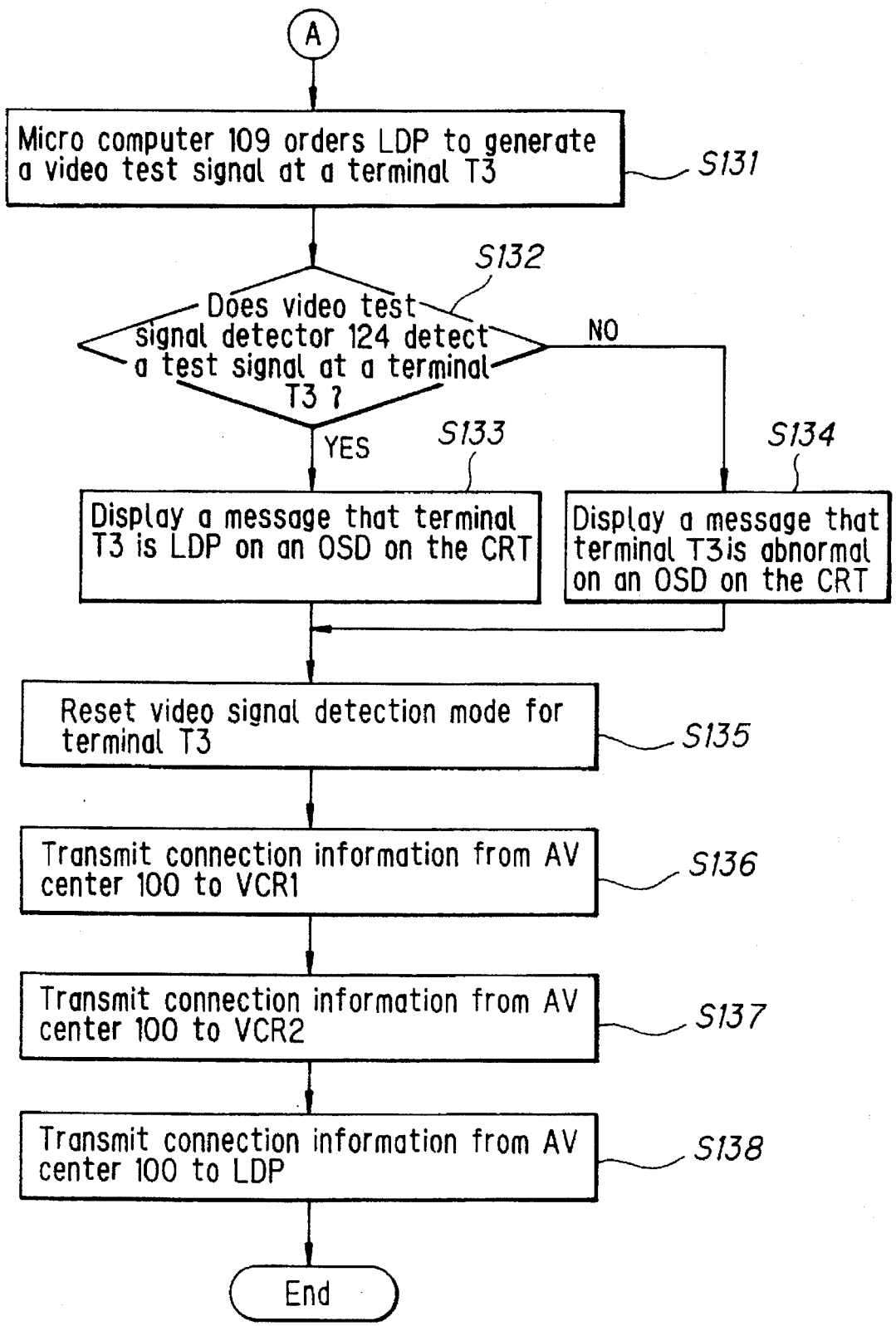
FIG. 7 shows a third portion of a flowchart showing an example of the connection setting initialization operation for the embodiment in FIG. 3.

Next, the D2B communications processor microcomputer 109 puts the data recorded in the non-volatile memory 107 into the work area of its own internal RAM (step S103) and the D2B then automatically sets its own address (step S104) before going to the main routine. During the main routine, the D2B communications processing microcomputer 109 rewrites data into the RAM work area and non volatile memory 107 after processes such as the D2B initialization setting, model type selection setting and function selection have been carried out by making a picture menu selection, operating the operating switch 101 or operating the remote controller 112. According to the process in FIG. 4, erratic program cycles and other faults are avoided in the D2B communications processing microcomputer 109 even if there is nothing initially in the non-volatile memory 107 because a default amount is written in. Also, it is usually designated in the workshop that various checks have to be carried out after the stabilizing data has been installed in the non-volatile memory 107. However, according to the process in FIG. 4, before the non-volatile memory is initialized, it also has to be released at least from the restrictions of the production sequence in order to prevent faults occurring. Also, when the user is setting up the initialization, a specific example of the intended initialization setting can be seen because the default amount stored in the non-volatile memory 107 can be viewed in the menu display. This means that the burden of setting up the initialization is decreased. Items initialized by the user will then have details such as their own equipment title and external audio visual terminal title. FIG. 5, FIG. 6 and FIG. 7 show a first portion, second portion and third portion, respectively, of a flowchart showing an example of the initialization operation of the connection setting for the embodiment in FIG. 3. If the operating switch 101 or the initialization switch on the remote controller 112 is pressed, the D2B communications microprocessor 109 for the television 100 outputs a video test signal detection operation instruction to the first VCR 30 via the D2B communications processing IC 110 and the D2B control line 121 and also makes the signal generator 122 output a video test signal to the audio visual input/output terminal T1 of the selector 118 (step S111).

Next, the D2B communications processing microcomputer 109 interrogates the first VCR 30 via the D2B control line 121 using D2B protocol to see whether or not the video test signal detector 34 for the first VCR 30 can detect the video test signal (step S112). If the video test signal detector 34 for the first VCR 30 can detect the video test signal (YES in step S113) the D2B communications processing microprocessor 109 is informed of the signal detection using D2B protocol via the D2B control line 121 and the D2B communications processing IC 110. In this way, the D2B communications processing microcomputer 109 determines if the first VCR 30 is connected to the audio visual input/output terminal T1 of the television 100 and displays this information in a column for the apparatus connected to T1 in an "on screen display" on the CRT 113 (step S114). Also, the first VCR 30 is interrogated for a title using D2B protocol, the results of which are displayed in a title column in an on screen display on the CRT 113 via the picture display IC 114 (step S114). For the case where there is no signal detection response from the first VCR 30 (NO in step 113), the D2B communications processing microcomputer 109 interrogates the second VCR 40 via the D2B control line 121 using D2B protocol to see whether or not the video test signal detector 44 for the second VCR 40 can detect the video test signal (step S115). If the video test signal detector 44 for the second VCR 40 detects the video test signal (YES in step 116, in this case the connection for the second VCR 40 would be different to that shown in FIG. 3 in that it would be connected to terminal T1 via the audio visual signal line 31), the D2B communications processing microprocessor 109 is informed of the signal detection using D2B protocol via the D2B control line 121 and the D2B communications processing IC 110. Depending on this, the D2B communications processing microcomputer 109 determines if the second VCR 40 is connected to the television terminal T1 and then displays this information about the second VCR 40 in the T1 equipment column of an on screen display on the CRT 113. Also, the first VCR 40 is interrogated for a title using D2B protocol, the results of which are displayed in a T3 title column in an on screen display on the CRT 113 via the picture display IC 114 (step S117).

In the case where there is also no signal detection response from the second VCR 40 (NO in step 116) the D2B communications processing microcomputer S118 displays an indication that something is wrong in the T1 column of the on screen display on the CRT 113 (In this example, up to a maximum of two VCRS are allowed to be connected. In the case where it is possible for three or more VCRS to be connected, it is determined whether or not a video test signal can be detected for the third and fourth VCRS and so on. This information is then passed on using D2B protocol through the D2B control line 121, the audio visual input/output terminal T1 and the audio visual signal line 31). When the process in step S114, step S117 and step S118 has finished, the D2B communications processing microcomputer 109 controls the switcher 118 and stops the outputting of the video test signal from the signal generator 122 to the terminal T1 of the switcher 118.

Next, the D2B communications processing microcomputer 109 for the television 100 puts the terminal T1 into video receive mode and then sends an instruction to the signal generator 32 of the first VCR 30 using D2B protocol via the D2B bus i.e. the control line 121 (i.e. designates an address for the first VCR 30) instructing it to start sending a video test signal (step S121). The signal receiver 124 is then interrogated to see if it has received a video test signal via terminal T1 (step S122). If received, it is indicated that both directions are OK in the T1 column of the on screen display on the CRT 113 (step S123). If the signal receiver 124 does not receive a video test signal an abnormality is indicated in the T1 column of the on screen display on the CRT 113 (step S124).

Next, the D2B communications processing microcomputer 109 for the television 100 takes the audio visual input/output terminal T1 out of video signal detect mode (step S125). The terminal T2 is then put into video detect mode and an instruction is sent to the signal generator 42 of the second VCR 40 using D2B protocol via the D2B bus i.e. the control line 121 (i.e. an address is designated for the second VCR 40) instructing it to start sending a video test signal (step S126). The signal receiver 124 is then interrogated to see if it has received a video test signal via terminal T2 (step S127). If received, it is indicated that both directions are OK in the T2 column of the on screen display on the CRT 113 (step S128). If the signal receiver 124 does not receive a video test signal an abnormality is indicated in the T2 column of the on screen display on the CRT 113 (step S129).

Then, the D2B communications processing microcomputer 109 for the television 100 takes the audio visual input/output terminal T2 out of video signal detect mode (step S130). The terminal T3 is then put into video detect mode and an instruction is sent to the signal generator 52 of the laser disc player 50 using D2B protocol via the D2B bus i.e. the control line 121 (i.e. an address is designated for the laser disc player 50) instructing it to start sending a video test signal (step S131). The signal receiver 124 is then interrogated to see if it has received a video test signal via terminal T3 (step S132). If received, the D2B communications processing microcomputer 109 determines if the laser disc player is connected to the terminal 3 of the television 100 and displays the existence of the laser disc player in the T3 equipment column of the on screen display on the CRT 11. Also, the laser disc player 50 is interrogated for a title using D2B protocol, the results of which are displayed in a T3 title column in an on screen display on the CRT 113 (step S133). If the signal receiver 124 does not receive a video test signal, an abnormality is indicated in the T3 column of the on screen display on the CRT 113 (step S134). Once the process in step S133 and step S144 is finished, the D2B communications processing microcomputer 109 takes the terminal T3 out of the video signal detection mode.

Once the connection set up conditions have been understood, the D2B communications processing microcomputer 109 for the television 100 transmits connection information showing these conditions to the first VCR 30, the second VCR 40 and the laser disc player 50 via the control line 121 (step S136, step S137 and step S138) so that the first VCR 30, second VCR 40 and the laser disc player 50 do not have to be instructed of these connection set up conditions a second time.

According to the embodiment in FIG. 3 and the process shown in FIG. 5, FIG. 6 and FIG. 7, the way in which the first VCR 30, second VCR 40 and laser disc player 50 are connected to the television 100 can be easily understood and the connection set up initialization for the first VCR 30, second VCR 40 and laser disc player 50 can be easily carried out.

In the embodiment in FIG. 3, a video signal has been used as the test signal to understand the connection conditions, but an audio signal could also be used.

The input output matrix for transmitting signals concerning connection information for the television 100 between the D2B communications processing microcomputer 109 and the television controller CPU 104 is not of the same form as that of the television hardware construction for the prior art where control codes are divided between each individual audio visual terminal. Instead, the AV terminals are intended for general use with plugs 1 to 6. This means that even if the connections to the audio visual terminals are all mixed up, control and transmission of the information concerning the input/output connections for the audio visual equipment can be achieved. Also, even if the signal connections inside the television are different, by using the same D2B module software program, instructions can be output to change over the connections of the CPU 104 and an answer can be made to a connection interrogation from the CPU 104.

According to the present invention, a common program for the D2B communications processing microcomputer 109 can be made along with a common D2B module for various models of television, so that for the case of flexible manufacturing, the number of design processes can be reduced. Also, the process can be clearly divided which enables the workload to be split up between a number of people working simultaneously. Also, operation of the internal bus 120 can be confirmed in real time by using a bus analyzer to confirm the data travelling in the bus.

Also, in the embodiment in FIG. 3 and I2C bus is used as the internal bus 120, but this bus is by no means limited to an I2C bus. Various buses such as a three line simultaneous serial bus, a non-serial bus or a parallel bus would also be suitable.

Figure 8:
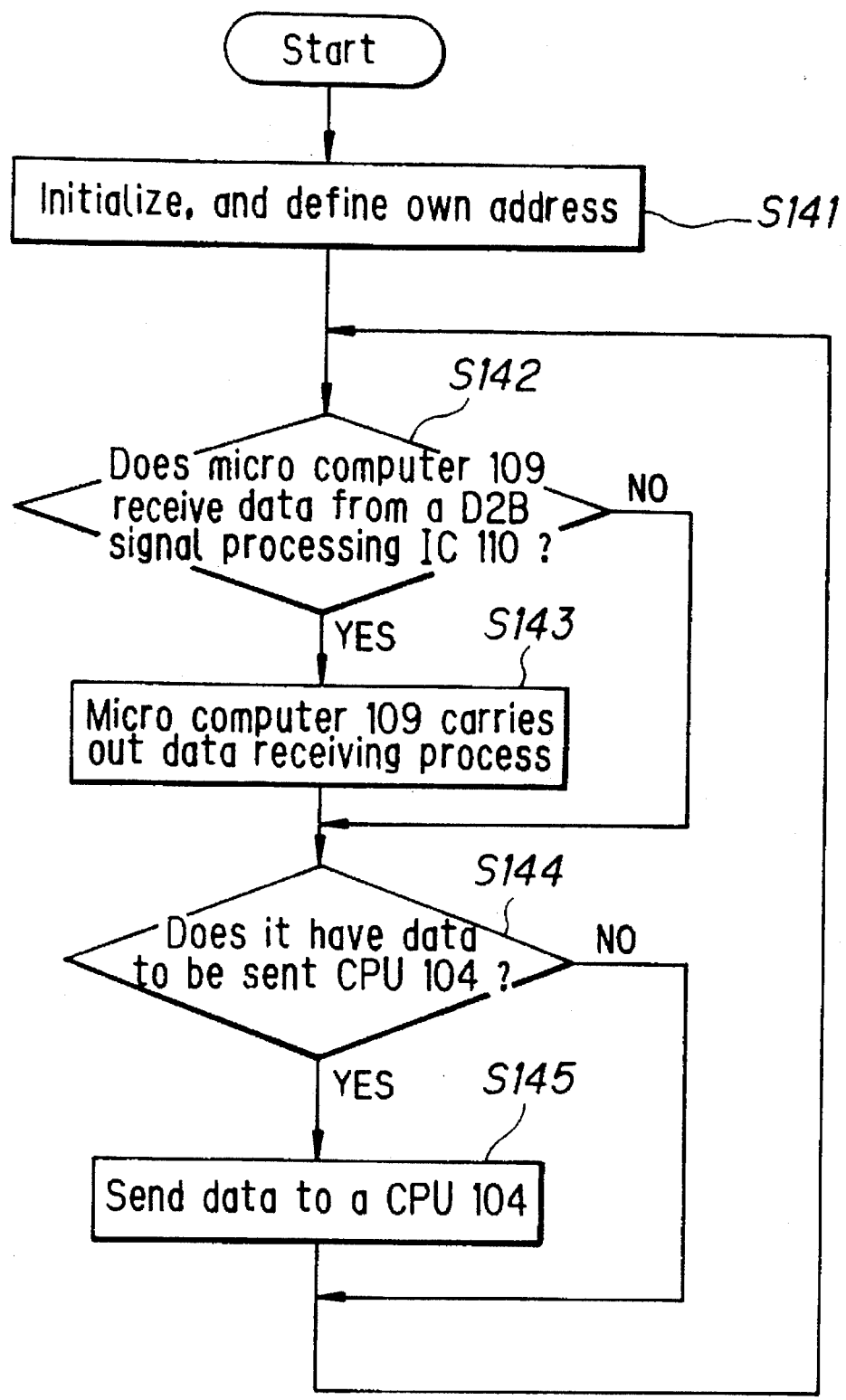
FIG. 8 is a flowchart of an example of the structure, i.e. an example of the process, for the program for the D2B communications processing microcomputer 109 for the embodiment in FIG. 3.

FIG. 8 is a flowchart showing an example of a program structure for the D2B communications processing microcomputer 109. First, the D2B communications processing microcomputer 109 carries out the initialization and assigns a self address (step S141). Next, the D2B communications processing microcomputer 109 determines whether a signal has been received from the D2B communications processing IC 110 (step S142). If received, the D2B signal receiving process is carried out (step S143). Then, the D2B communications processing microcomputer 109 determines whether or not there is any communications control data to send to the CPU in the television (step S144). If present, an instruction is transmitted to the CPU 104 (step S145).

An embodiment is shown in FIG. 9 where the audio visual line and the D2B control line are lumped together with the connections between each item of audio visual equipment and the television, i.e. the VCR 30, laser disc player 50 and the television 100, looping around each other. The audio visual line and the D2B control line are lumped together in the cable which connects the television 100 and the laser disc player 50.

The connector cable 300 which connects the television 100 and the VCR 30 is, for example, as shown in FIG. 10, made up of a video output line 301, a video input line 302, an audio output line 303, an audio input line 304 and a D2B control line 305. When the audio signal is a stereo signal, as is shown in FIG. 11, the audio output line 303 is made up of a left audio output line 303L and a right audio output line 303R and the audio input line 304 is made up of a left audio input line 304L and a right audio input line 304R.

Figure 12:
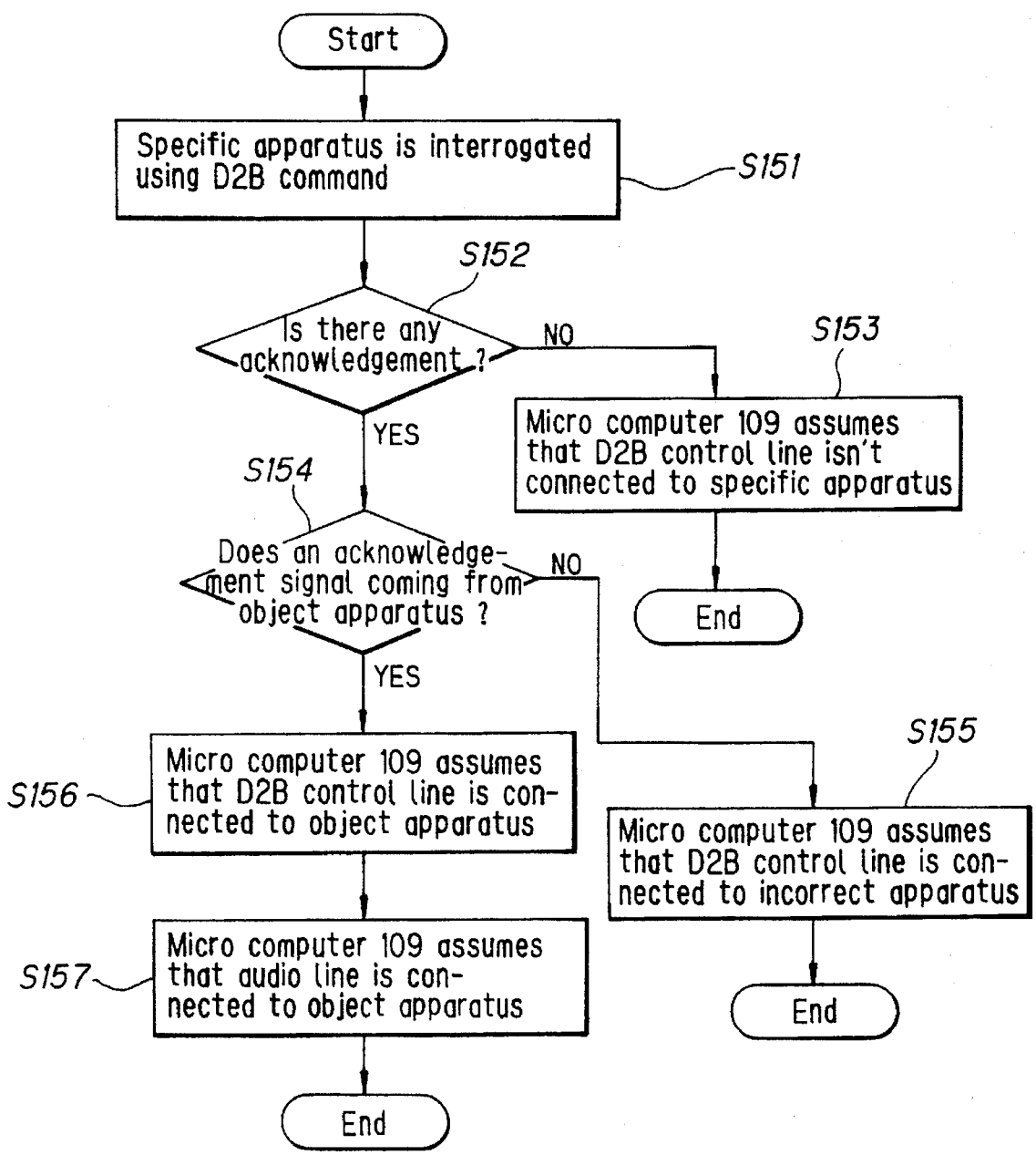
FIG. 12 is a flowchart of an example of the connection determination operation for the embodiment in FIG. 9.

FIG. 12 is a view of an example of the connection determination operation for the embodiment in FIG. 9. First, the D2B communications processing microcomputer 109 for the television 100 in FIG. 3 assigns an address to a specific piece of equipment such as, for example, the VCR 30 and is then interrogated using a D2B command (step S151). If there is no response to this interrogation, an address error is generated (N0 in step S152) and the D2B communications processing microcomputer 109 determines that the D2B control line is not connected to this item of equipment(step S153).

If there is a response (YES in step 152) the D2B communications processing microcomputer 109 checks to see if the answer is from the object apparatus.

If the answer is not from the object equipment (NO in step 154), the D2B communications processing microcomputer 109 determines that equipment other than the object equipment is connected (step S155). If the response is from the object equipment (YES in step S154), the D2B communications processing microcomputer 109 determines that the D2B control line is connected to the object equipment (step S156) and determines that the audio visual line which is lumped together with the D2B control line is also connected to the object equipment (step S157).

As with the embodiment in FIG. 9, by using a connector cable where the audio visual lines and the D2B lines are lumped together, problems at the time of the initialization set up due to mistaken or forgotten cabling can be avoided.

Also, when determining in what way an opposing item of equipment is connected to the television via the D2B control line, verification that the object equipment is connected using the D2B control line (i.e. determining existence within the system) also verifies that the audio visual line is connected. In this way, the connection conditions at the time of initialization set up can be understood. Now, if the cable which the audio visual line and the D2B control line are lumped together in (hereinafter referred to as the AV connector cable, with the D2B signal being indicated by "C") has a lot of audio visual connectors to connect to the television connector terminals, if the cable is connected to the television incorrectly the system will not operate properly. So, in order to discern which audio visual terminals the audio visual connector cable is connected to, "C" is switched on and off at each of the television audio visual terminals so that it can understand at which terminal the D2B signal is presently being transmitted from.

Figure 13:
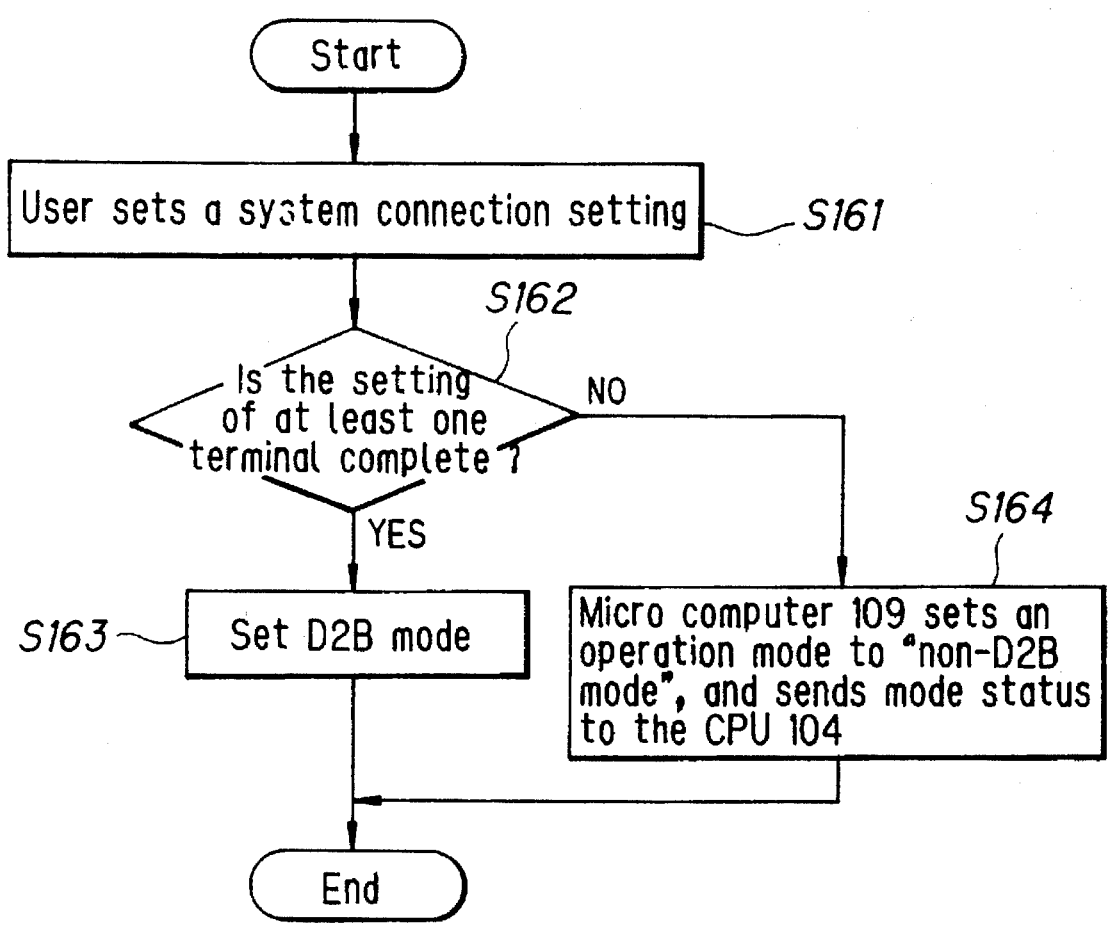
FIG. 13 is a flowchart showing an example of the automatic set-up operation for the D2B mode and the non-D2B mode for the embodiment in FIG. 3.

FIG. 13 is a view of an example of the automatic set-up operation for the D2B mode and the non-D2B mode for the embodiment in FIG. 3. The user carries out the connection set-up process for the television and, for example, an item of external equipment such as the VCR 30, by looking at, for example, a picture menu displayed on the CRT 113 while operating the operating switch 101 or the remote controller 112 (step S161). In reality, when the connection set up for at least one of the audio visual terminals such as, for example, T1 is completed (YES in step S162), the D2B communications processing microcomputer 109 selects D2B mode and the TV control CPU 104 is informed of this vis the internal bus 120 (step S163). If the connection set-up is not completed, the D2B communications processing microcomputer 109 selects non-D2B mode and the TV control CPU 104 is informed of this via the internal bus 120 (step S164).

Figure 14:
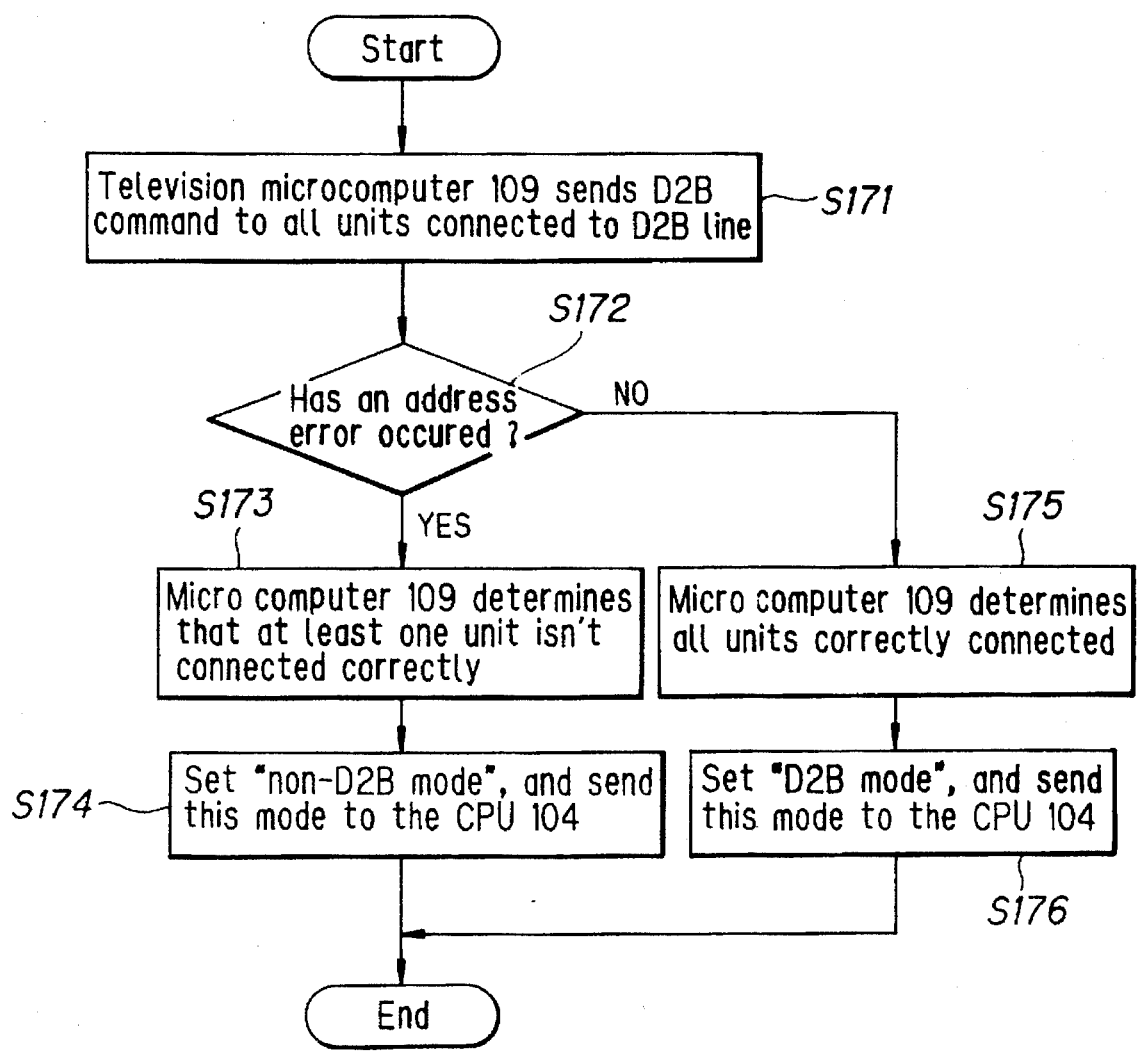
FIG. 14 is a flowchart showing a further example of the automatic set-up operation for the D2B mode and the non-D2B mode for the embodiment in FIG. 3.

FIG. 14 is a view of a further example of the automatic set-up operation for the D2B mode and the non-D2B mode for the embodiment in FIG. 3. After each of the items of audio visual equipment which are connected to the television 100 are plugged in and switched on, the television 100 is also plugged in ad switched on. The D2B communications processing microcomputer 109 for the television 100 then transmits D2B commands conforming to the D2B standard to all of the items of audio visual equipment via the control line 121 (step S171). If an item of audio visual equipment is not connected to the television 100, an address error is created (YES in step S172). The D2B communications processing microcomputer 109 then determines that an item of equipment is not connected to the television 100 correctly (step S173), selects non-D2B mode, and informs the TV controller CPU 104 (step S174). When the audio equipment is connected to the television 100 correctly, an address error is not generated (NO in step S172), the D2B communications processing microcomputer 109 determines that all the equipment is connected to the television 100 correctly (step S175), D2B mode is selected and the TV controller CPU 104 is informed (step S176).

According to the process in FIG. 13 and FIG. 14, it is no longer necessary for the D2B mode or the non D2B mode to be selected by the user. Also, if the TV controller CPU 104 selects non-D2B control mode, this can be sorted out without undergoing the process for the D2B, so that close attention can be paid to TV control processes from the remote controller 112 such as instruction processes and station select processes which will make the speed of the TV control process fast. For example, the speed of response to instructions issued by the remote controller 112 will become fast, so that the operation of the remote controller 112 will be more appealing.

Figure 15:
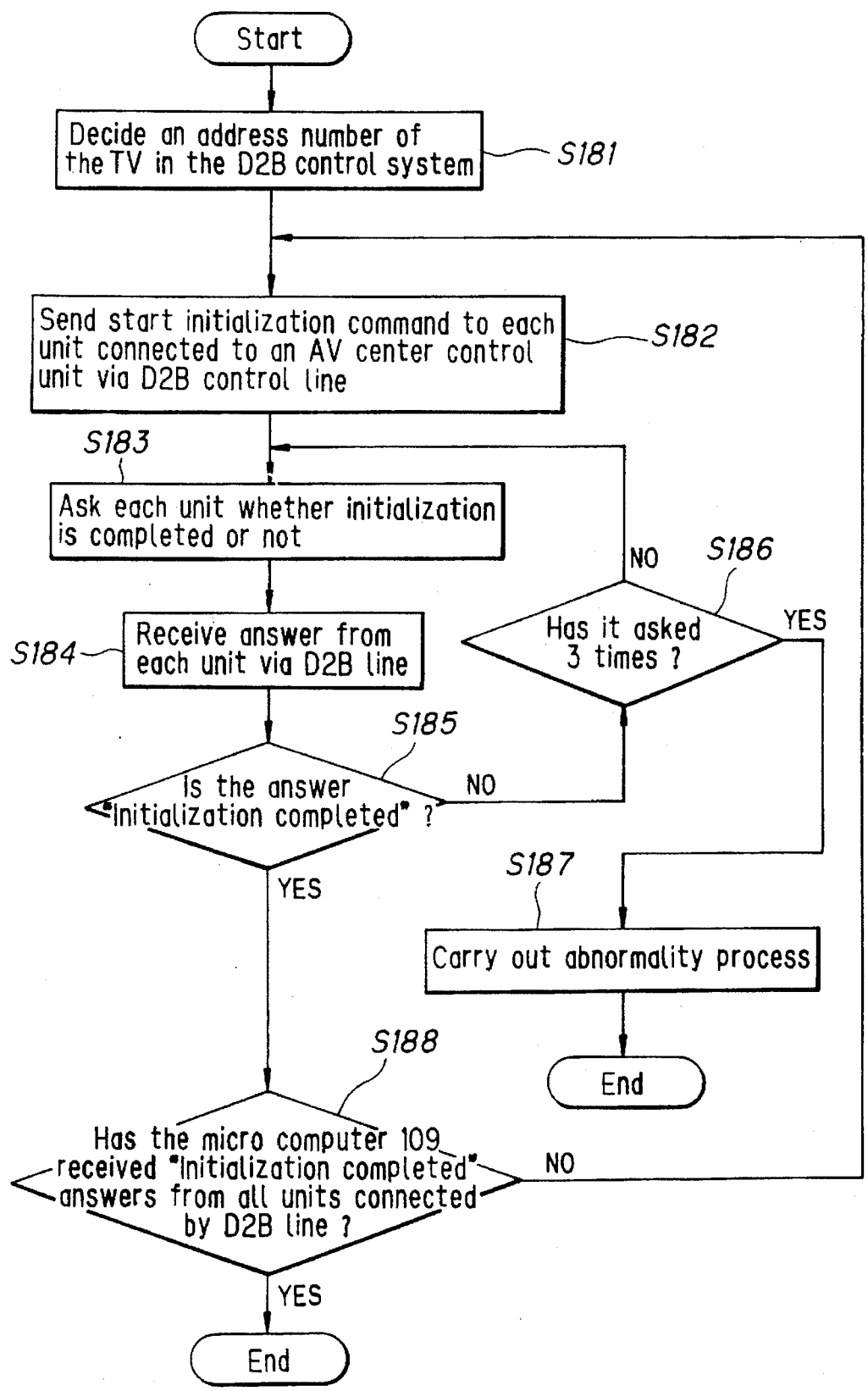
FIG. 15 is a view of an example of the initialization process for the embodiment in FIG. 3.

FIG. 15 is a view of an example of the initialization process for the embodiment in FIG. 3. First, the D2B communications processing microcomputer 109 designates an address to the television 100 (step S181). The D2B communications processing microcomputer 109 then sends a command to the address assigned to the television 100 via the D2B control line 121. If an address error occurs it means that this address does not as yet represent an item of audio visual apparatus in this system and so this address is assigned to the television 100. If an address error does not occur, this address is incremented by one, and the same process is again carried out. If an address error does still not occur, the address is repeatedly incremented by one until an address error does occur (up to a maximum of 8) and the address at which an address error occurs is then assigned to the television 100.

Next, the D2B communications processing microcomputer 109 sends each of the items of audio visual equipment connected to the television 100 a discrete initialization start command via the D2B control line 121 in order that they can start their initialization (step S182). If an address error occurs during this time this means that the television is not connected to this particular piece of equipment i.e. that an equipment address greater than 8 has been transmitted (only up to eight of the same kinds of equipment are allowed in the same system).

Then, the D2B communications processing microcomputer 109 interrogates each of the items of audio visual equipment connected to the television 100 via the D2B control line 121 to see if their initialization is completed (step S183) and receives the response from each item of audio visual equipment via the D2B control line 121 (step S184). When each item of audio visual equipment has undergone initialization it is decided whether to operate in D2B mode or non-D2B mode and if D2B mode is decided, the necessary self address is also decided. If the response received in step S184 indicates that the initialization is not completed (NO in step S185), the interrogation of this equipment is carried out three times. If, as before, the initialization has still not been completed (NO in step S185 and YES in step S186), an abnormality is deemed to have occurred and a predetermined abnormality process is carried out (step S187). If, during this triple interrogation, there is a response confirming the completion of the initialization (YES in step S185) and if this means that all the completion of initialization responses have been received from the items of audio visual equipment, the D2B communications processing microcomputer 109 completes the initialization process.

According to the process in FIG. 15, the initialization procedure for the overall system is simplified because the initialization of the audio visual equipment which is connected to the television 100 such as the VCRS 30 and 40 and the laser disc player 50 is done using initialization start commands which come from the television 100. Also, by transmitting initialization start commands from the television to each item of audio visual equipment, it can be determined which item of equipment is connected to the television 100. After that, when the user is setting up the connections for the audio visual terminals by using the dialogue method while looking at a menu in an on screen display on the CRT 113, the displayed menu can be limited just to the items of audio visual equipment which are actually connected so that the setting up work that the user does is made easy.

Figure 16:
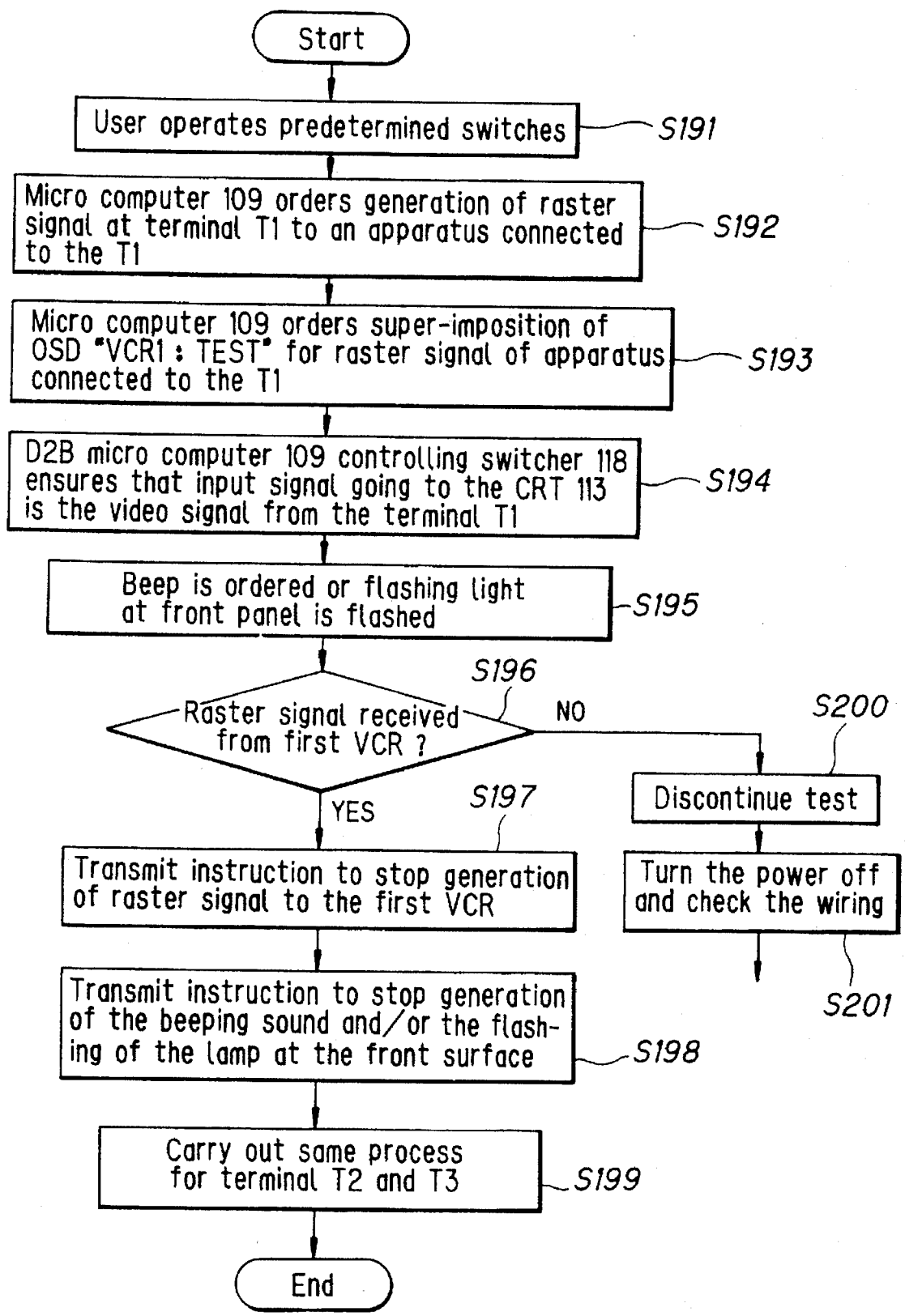
FIG. 16 is a flowchart showing a connection confirmation method for the embodiment in FIG. 3.

FIG. 16 is a view of an embodiment of a connection confirmation method for a second embodiment of this invention. In this embodiment, a confirmation process is carried out which does not need the video test signal generators 32, 42, 52 and 122 or the video test signal detectors 34, 44, 54 and 124 which were used in the embodiment in FIG. 3. First, the user operates the operating switch 101 or the connection confirmation indication switch on the remote controller 112 (step S191). In response to this, the D2B communications processing microcomputer 109 for the television 100 transmits a raster signal generation instruction to the first VCR 30 which appears to be connected to the audio visual input/output terminal T1 (step S192). The video raster signal is made up of picture information i.e. simply just a synchronization signal or a synchronization signal, XXX signal and a chrominance signal. Naturally, video raster signal generators are provided in video equipment such as VCRS and laser disc players.

Next, the D2B communications processing microcomputer 109 for the television 100 puts an on screen display such as [VCR 1: TEST] onto the screen indicating the status of the first VCR 30 believed to be connected to the audio visual input output terminal T1 (step S193). Then, the D2B communications processing microcomputer 109 controls the switcher 118 to ensure that the input signal going to the CRT 113 is the video signal coming from the audio visual terminal T1 (step S194). Moreover, the D2B communications processing microcomputer 109 also indicates the status of the first VCR 30 believed to be connected to the audio visual terminal T1 by generating a beeping sound (or by a flashing light on the front surface) via the D2B communications processing IC 110 and the D2B control line 121 (step S195).

If a video raster signal containing a message is received and displayed [i.e. VCR 1: TEST] on the CRT 113 of the television 100 along with a beeping sound (or a flashing lamp on the front surface i.e. YES in step 196) and the connected apparatus, namely the first VCR 30, is the desired apparatus, the user can confirm this as being acceptable by operating the operating switch 101 or the remote controller 112. In this way, the D2B communications processing microcomputer 109 for the television 100 transmits an instruction to halt the generation of the video raster signal to the first VCR 30 via the D2B communications processing IC 110 and the D2B control line 121 (step S197). An instruction is then transmitted to stop the generation of the beeping sound and/or the flashing of the lamp at the front surface (step 198). The process in steps 192 to 198 is then carried out for audio visual input output terminals T2 and T3 (step S199).

If a video raster signal from the VCR 30 is not displayed on the CRT 113 (NO in step 196), the user should discontinue the test (step S200), turn the power off and check the wiring.(step S201)

As described above, according to the connection confirmation method in FIG. 16, connection confirmation can be carried out at a low cost as the only equipment needed is a video raster signal generator, an on screen display overlay function, a beeping noise generator and a flashing lamp on the front surface.

The on screen display overlay, buzzer generator and front surface flashing lamp can all be included or items can be omitted.

Also, a small "picture in picture" could be used to display the on screen data from each piece of equipment as a way of indicating the operations to the user. In this way, the user can easily understand the intended operations.

Also, the aforementioned embodiment, there were three input/output terminals for the television 100 but more can be used if necessary, as is the case with the number of VCRS and laser disc players. It would also be possible to connect a compact disc player.

Third Embodiment

Figure 17:
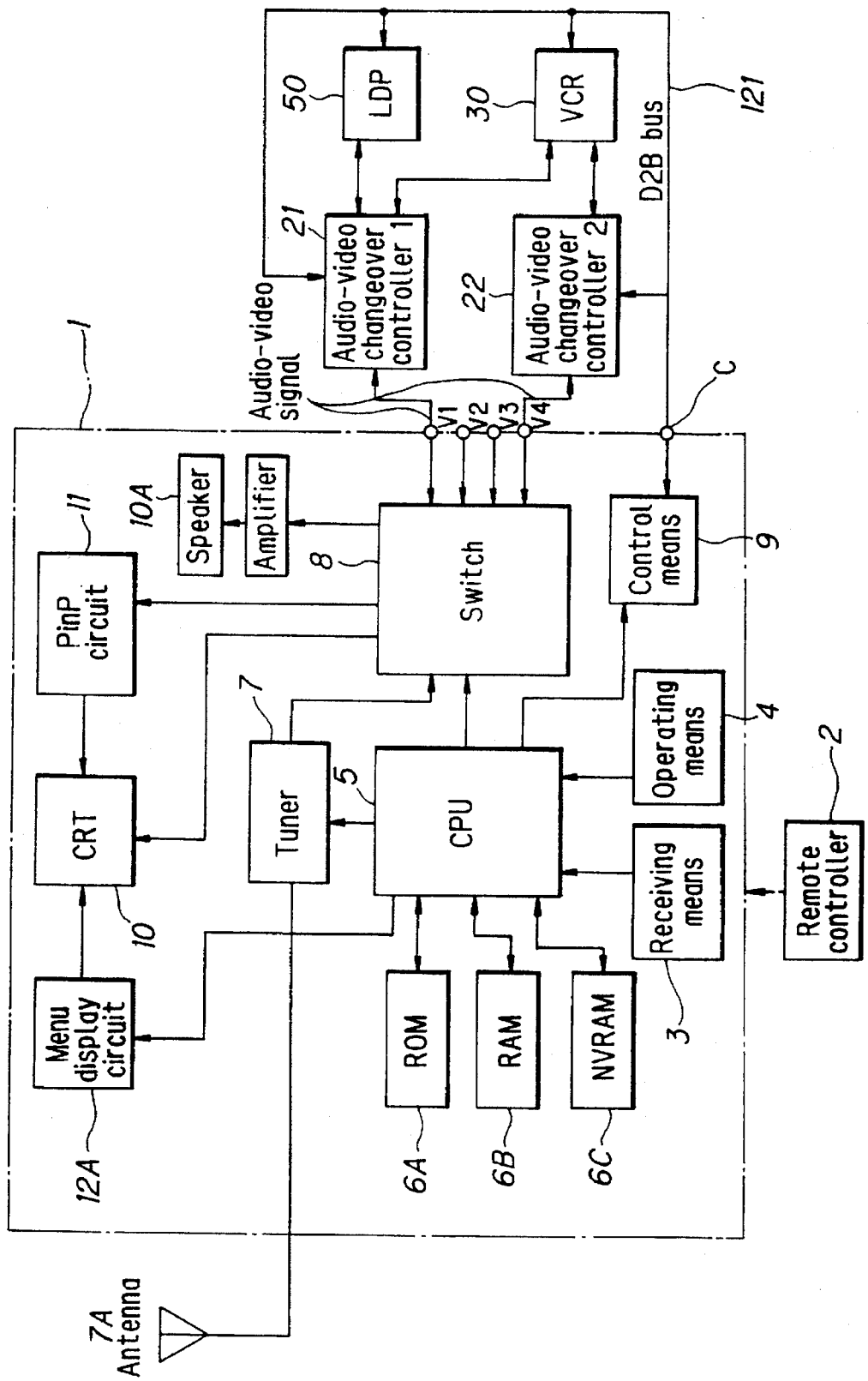
FIG. 17 is a block diagram of the construction of connection control apparatus suitable for an audio visual system for a third embodiment of the present invention.

FIG. 17 is a view of the construction of connection control apparatus suitable for an audio visual system for an embodiment of the present invention. A first audio-video input/output terminal i.e. plug V1 for the television 1 is connected to a first audio/video switching controller 21. The first audio-video switching controller 21 is then connected to the laser disc player 50 and the VCR 30. A fourth audio-video input/output terminal i.e. plug V4 for the television 1 is then connected to a second audio/video switching controller 22. This second audio/video switching controller 22 is then connected to the VCR 30. In the example in FIG. 17, there is nothing connected to the second and third plugs V2 and V3 but it would be possible to connect another audio/video switching controller or another item of audio/video equipment to these plugs.

The remote controller 2 has the following switches: a power supply switch for turning the television 1 on and off; a channel select switch for selecting channels; a volume level switch for adjusting the volume of the sound coming out of the speaker 10A; a connection instruction switch for outputting connection instructions to audio visual equipment such as the laser disc player 50 and the VCR 30; a play/record select switch; and a control switch for controlling audio visual equipment such as the laser disc player 50 and the VCR 30. The infra-red light corresponding to an operated switch is output by an internally constructed light-emitting element.

The optical receiver 3 receives the light transmitted by the remote controller 2, converts it into an electrical signal, and sends the electrical signal to the CPU 5. An operating means 4 then has the same switches as the remote controller 2 which, when operated, will enact operations such as turning the television 1 on and off, selecting the channel, and controlling audio visual equipment such as the laser disc player 50 and the VCR 30.

The CPU 5 controls the tuner 7, the switcher 8, the controller 9, the menu message display circuit 12A and the volume of the speaker 10A. The ROM 6A holds the program and data necessary for the operation of the CPU 5. The RAM 6B is for storing data such as processing results for the CPU 5. The NVRAM (non-volatile memory) 6C is for storing data which has to be retained after the power supply has been turned off.

The CPU 5 stores the connection paths selected by the user for the equipment connected to plugs V1 to V4 by the user in the NVRAM 6.

The volume is controlled by the CPU 5 so that when the volume level switch for the operating means 4 or the remote controller 2 is operated the volume of the sound output from the speaker is adjusted. The tuner 7 selects a channel picking out an audio/video signal from the object frequency provided by the antenna 7a and sends it to the switcher 8.

The control means 9 is connected to audio visual equipment such as the laser disc player 50 and the VCR 30 via the control input/output terminal C and the D2B bus 121.

Operations such as the turning on and off and the playing of the audio and picture for audio visual equipment such as the laser disc player 50 and the VCR 30 can then be controlled by operating the remote controller 2 or the operating means 4. The control means 9 also provides connection instructions sent from the CPU 5 to the first and second audio-video switching controllers 21 and 22 for audio-visual equipment such as the laser disc player 50 and the VCR 30.

During play, the switcher 8, in response to a connection instruction from the CPU 5, selects one from the audio-video signal output by the tuner and the audio-video signals sent by audio visual equipment such as the VCR 30 and the laser disc player 50 to plugs V1, V2, V3 and V4 and then sends this video signal to the CRT 10 and the audio signal to the speaker 10A via an amplifier.

During recording, the switcher will send the audio-video signal from the tuner 7 to either of the plugs V1, V2, V3 and V4 upon receipt of connection instructions from the CPU 5.

The switcher 8 will then select one video signal from the video signals provided by audio visual equipment such as the VCR 30 and the laser disc player 50 which are controlled by the control means 9 and send it to the picture in picture circuit 11. The picture in picture circuit 11 then converts the signal provided by the switcher 8 into a picture in picture video signal. This is to say that the picture in picture circuit 11 changes the signal into a picture in picture signal which can be displayed within a predetermined part of the CRT 10.

The menu display circuit 12A displays a number of possible connection paths within a predetermined region of the CRT 10 under the control of the CPU 5. This helps the user to decide which of the connection paths to select for the audio visual equipment connected to the input output terminals of the television 1 i.e. the first to fourth plugs V1 to V4.

The CRT 10 displays the picture for the video signal output from the switcher 8. It also overlays onto the screen images corresponding to the data for the video signals from the picture in picture circuit 11 and the menu display circuit 12A.

Figure 18:
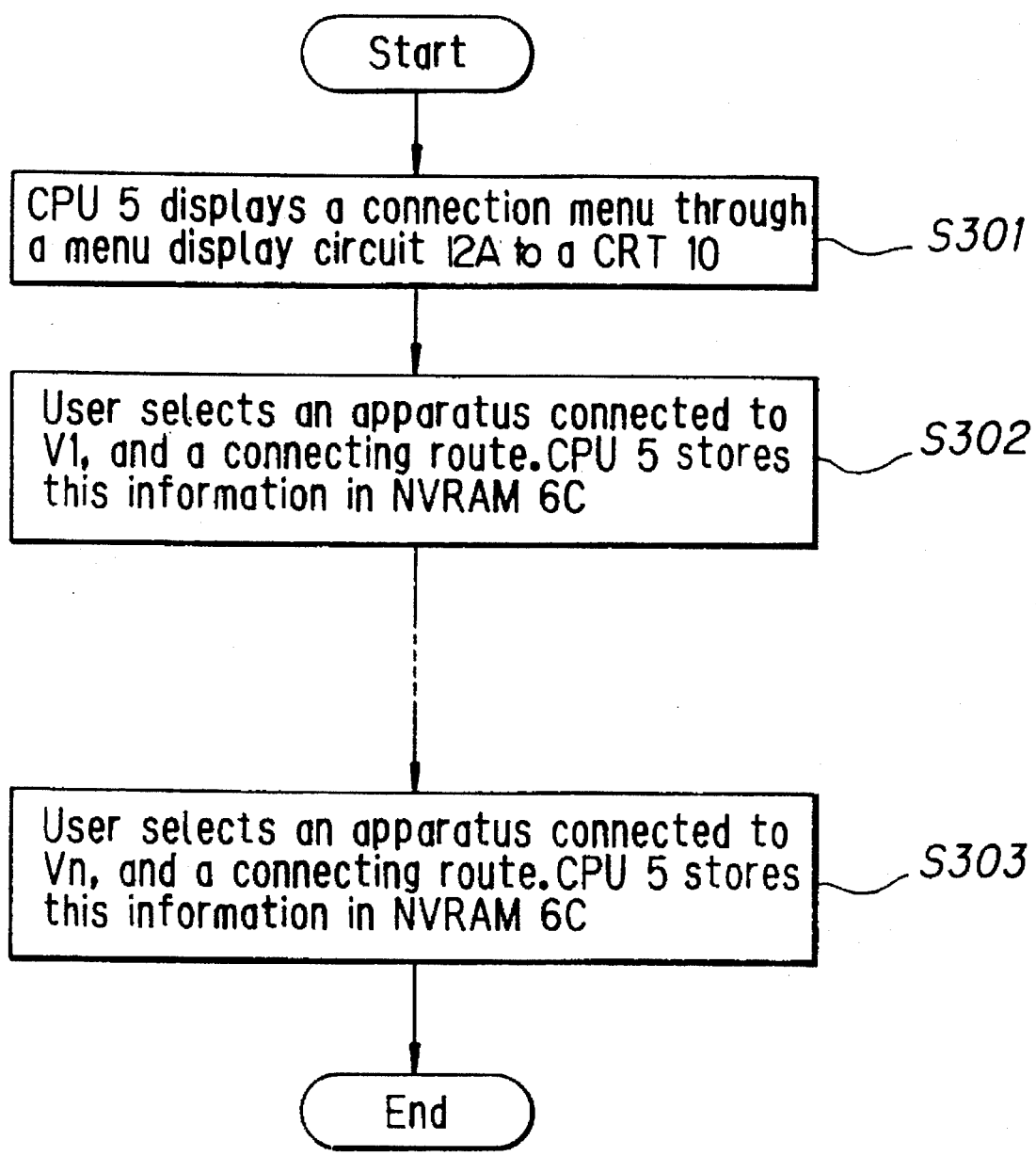
FIG. 18 is a flowchart showing an example of the operation at the time of the setting up of the connection initialization for the embodiment in FIG. 17.

FIG. 18 is a view of the an example of the operation at the time of the setting up of the connection initialization for the embodiment in FIG. 17. First, in step S301, the CPU 5 displays a number of connection paths for the audio visual equipment to the user on the CRT 10 via the menu display circuit 12A. The user then first selects the video equipment connected to the first input/output terminal for the television i.e. the equipment connected to the first plug V1 (for example, the laser disc player 50). The connection path for this audio equipment is then selected (for example, a connection path passing through the switchbox for the first audio/video switching controller), and the CPU 5 will then store the information concerning the selected audio/video equipment and connection path in the NVRAM 6C (step S302).

Next, the user selects the audio visual equipment to be connected to the second and third plugs V2 and V3, and so on, selects the connection paths for this audio visual equipment and then stores the selected audio visual equipment and connection paths in the NVRAM 6C. Finally, the audio visual equipment to be connected to the nth plug Vn of the television 1 is selected (plug V4 in the example in FIG. 17).

The connection path for this audio visual equipment is selected (for example, a connection path passing through the switcher for the second audio-video switching controller) and the CPU 5 stores the information concerning the selected audio visual equipment and connection path in the NVRAM 6C (step S303).

Figure 19:
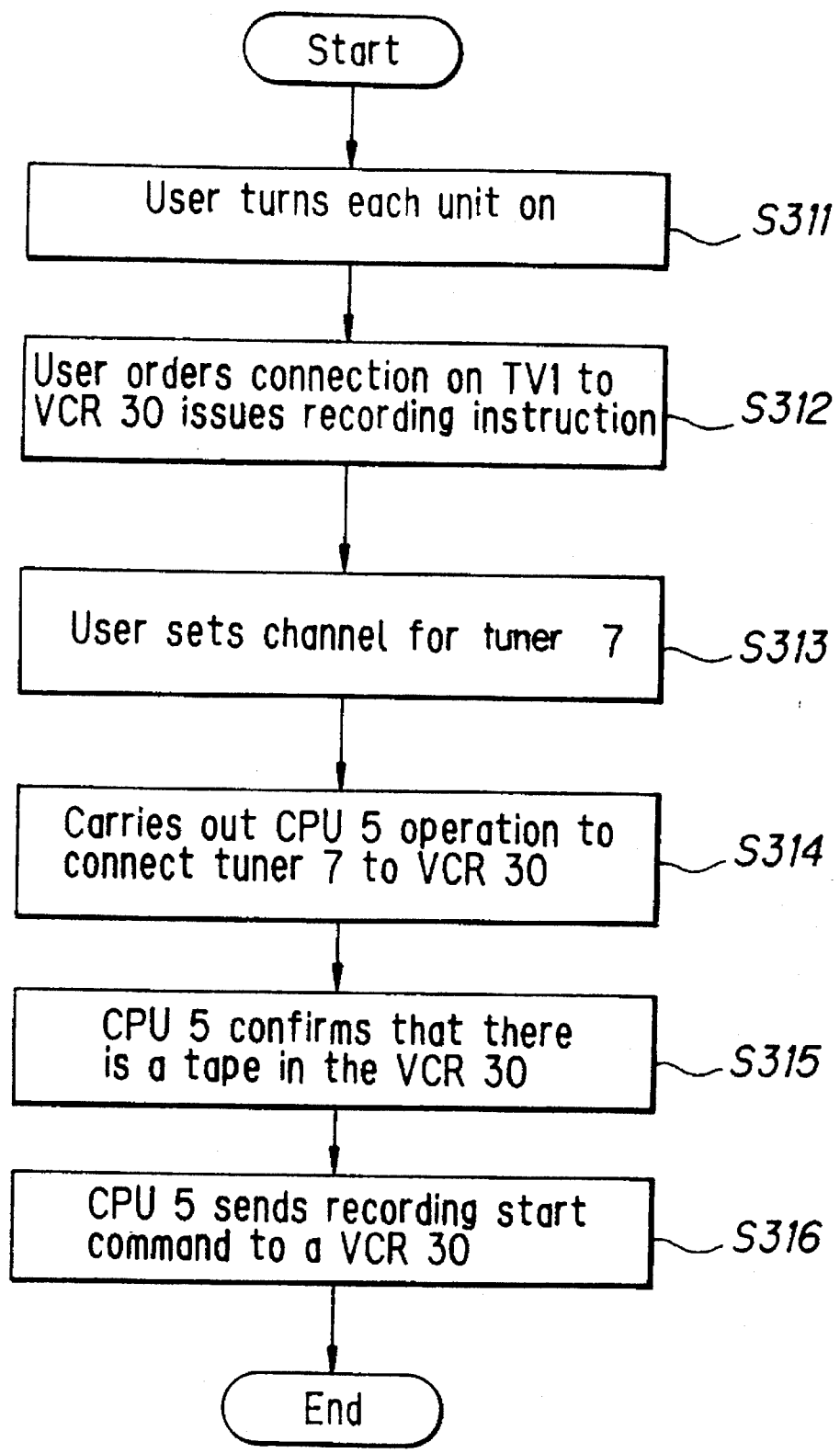
FIG. 19 is a flowchart showing an example of the operation at the time of recording for the embodiment in FIG. 17.

FIG. 19 is a view of the operation when the audio-video signal output from the tuner 7 of the television 1 is recorded by the VCR 30 for the embodiment in FIG. 17. First, the user turns on the power supply for each item of equipment to be used (i.e. the television 1 and the VCR 30) by operating equipment such as the remote controller 2 (step S311). Next, the user outputs a connection instruction and a recording instruction from the television 1 to the VCR 30 again by operating equipment such as the remote controller 2 (step S312). Then, the channel from the tuner 7 belonging to the television 1 is set up in the same way (step S313).

Figure 20:
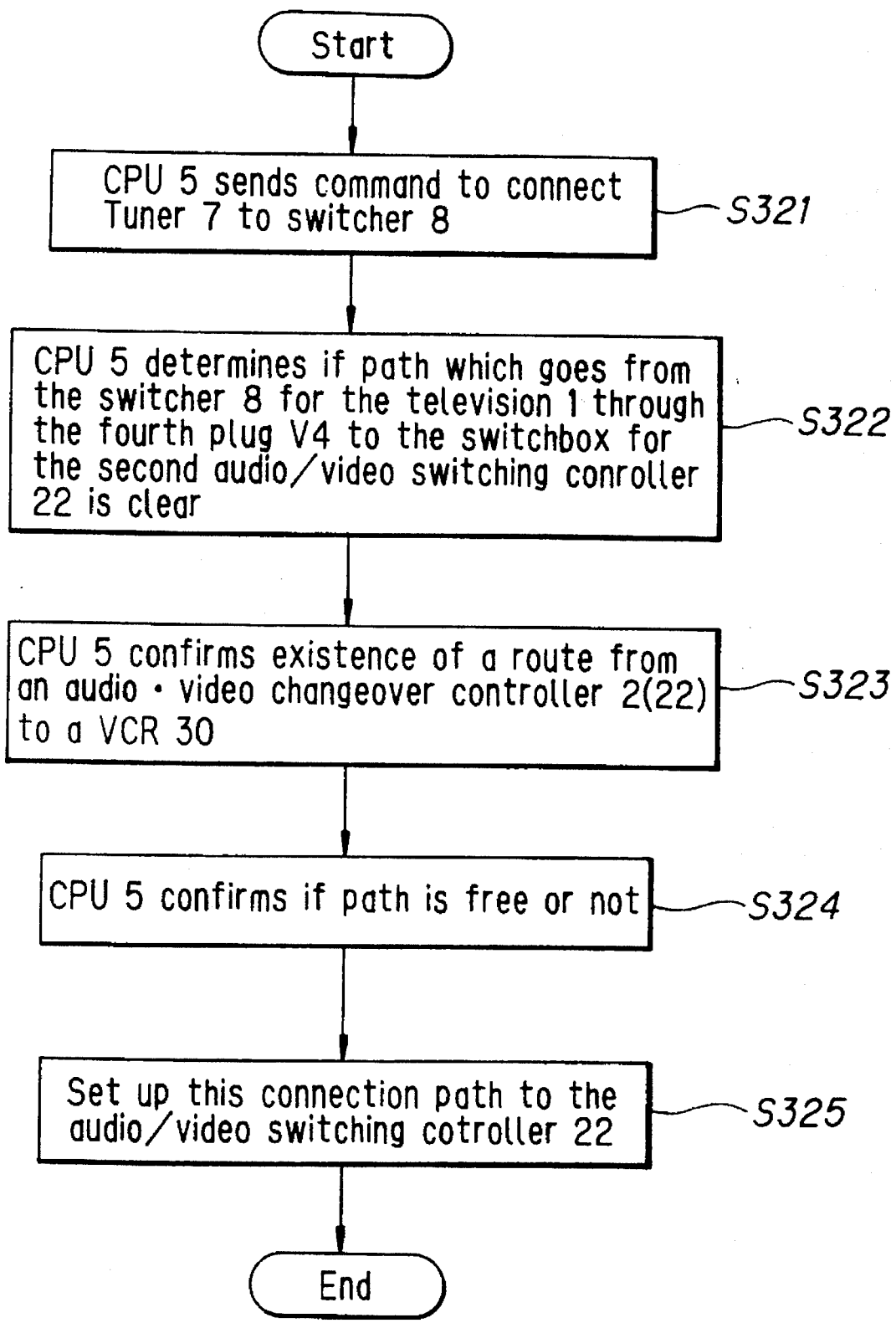
FIG. 20 is a flowchart showing an example of the process (connection instruction execution from the tuner to the VCR) shown in step S324 in FIG. 19.

The CPU 5 then makes a connection between the tuner 7 of the television 1 and the VCR 30 in response to the aforementioned connection instruction and recording instruction from the user (step S314). The CPU 5 then confirms that there is a tape in the VCR 30 (step S315) and sends a recording start instruction to the VCR 30 (step S316). FIG. 20 is a view of how this connection process is carried out. First, the CPU 5 reads out the contents of the NVRAM 6C (the NVRAM 6C, as with the aforementioned example, contains information about the fourth input output terminal i.e. the plug V4 selected as the plug to which the VCR 30 is connected along with data for the connection path which passes through switcher on the way to the switcher for the second audio/video changeover controller 22), the connection instruction sent from the tuner 7 of the television 1 to the switcher 8 is output from the switcher 8 and a video signal is outputted from the tuner 7 to the switcher 8 (step S321). Next, the CPU 5 determines whether or not it is possible to use the path which goes from the switcher 8 for the television 1 (i.e whether it is in use), through the fourth audio/video input output terminal i.e. the fourth plug V4 to the switchbox for the second audio/video switching controller 22 (step S322).

Then, the CPU 5 confirms if there is a path from the second switching controller 22 to the VCR 30 (step S323). It then determines if that path is free or not (step S324), sends a connection instruction from the second audio/video switching controller 22 to the VCR 30 via the controller 9 and then sets up this connection path (step S325).

The above embodiment is therefore not like the prior art where the connection path via the first audio/video switching controller 21 is first checked and then the connection path via the second audio/video switching controller 22 is then checked. Instead, the connection path stored in the NVRAM 6C is first checked so that the possibility of connection can be confirmed immediately and the amount of time the connection process takes can be reduced.

Figure 21:
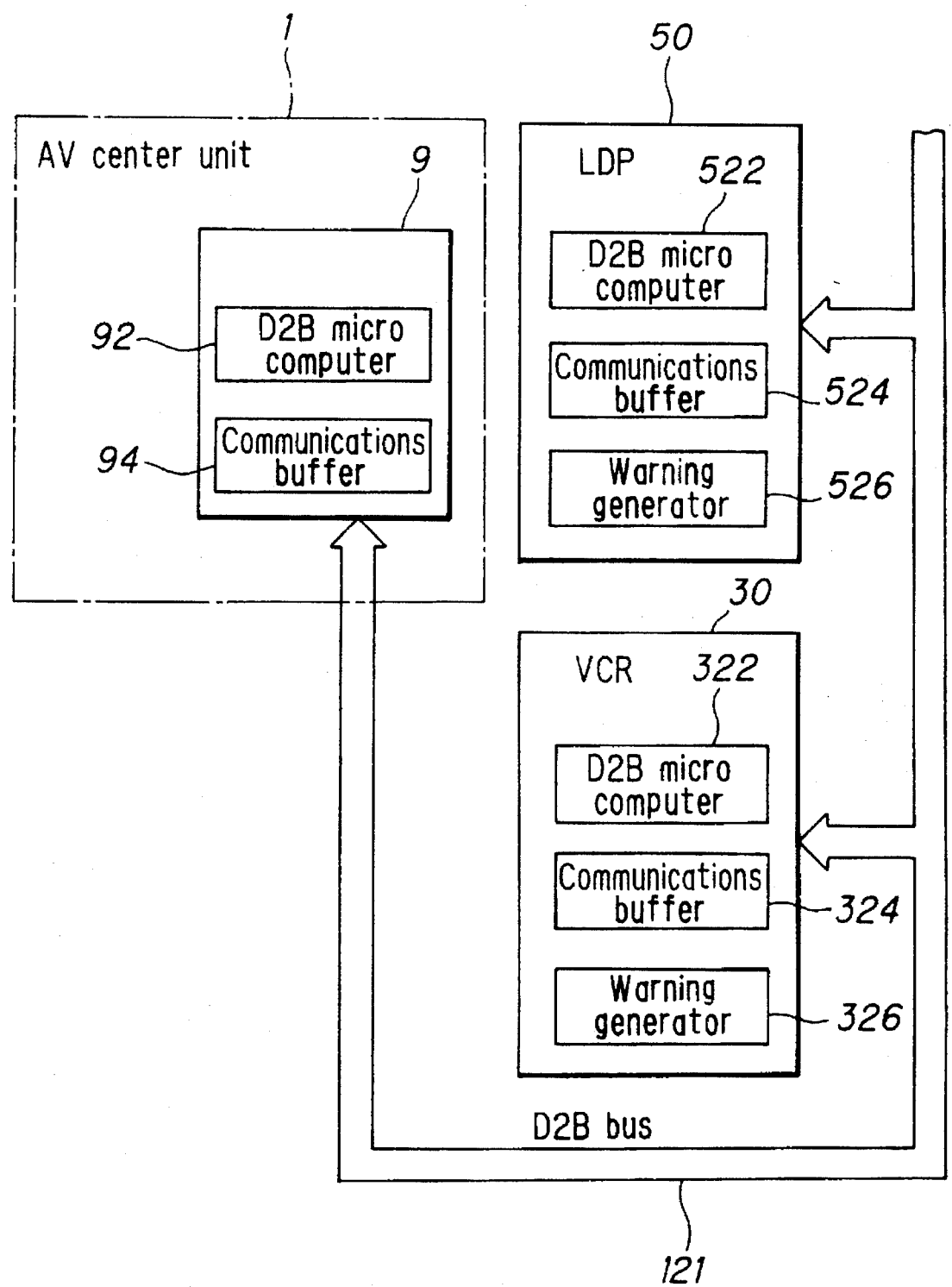
FIG. 21 is a block diagram of an example modification of the embodiment in FIG. 17.

FIG. 21 is a view of a modification of the embodiment in FIG. 17. Here, the control means 9 for the television 1 has a D2B communications processing microcomputer 92 (hereinafter referred to as the D2B microcomputer) and a communications buffer 94. The D2B microcomputer 92 outputs D2B commands, interrogations and responses such as connection instructions for the VCR 30 and the laser disc player 50. The communications buffer 94 stores items such as D2B commands output from the D2B microcomputer 92 or transmitted via the D2B bus 121 for a fixed period of time.

The laser disc player 50 has a D2B microcomputer 522, a communications buffer 524 and a warning generator 526. The D2B microcomputer 522 outputs items such as D2B commands, interrogations and responses. The communications buffer 524 stores items such as D2B commands output from the D2B microcomputer 522 or transmitted via the D2B bus 121 for a fixed period of time. The warning generator 526 is made up of a light generating element or a sound generator which is controlled by the D2B microcomputer 522.

The VCR 30 has a D2B microcomputer 322, a communications buffer 324 and a warning generator 326. The D2B microcomputer 322 outputs items such as D2B commands, interrogations and responses. The communications buffer 324 stores items such as D2B commands output from the D2B microcomputer 322 transmitted via the D2B bus 121 for a fixed period of time. The warning generator 326 is made up of a light generating element or a sound generator which is controlled by the D2B microcomputer 322.

Figure 22:
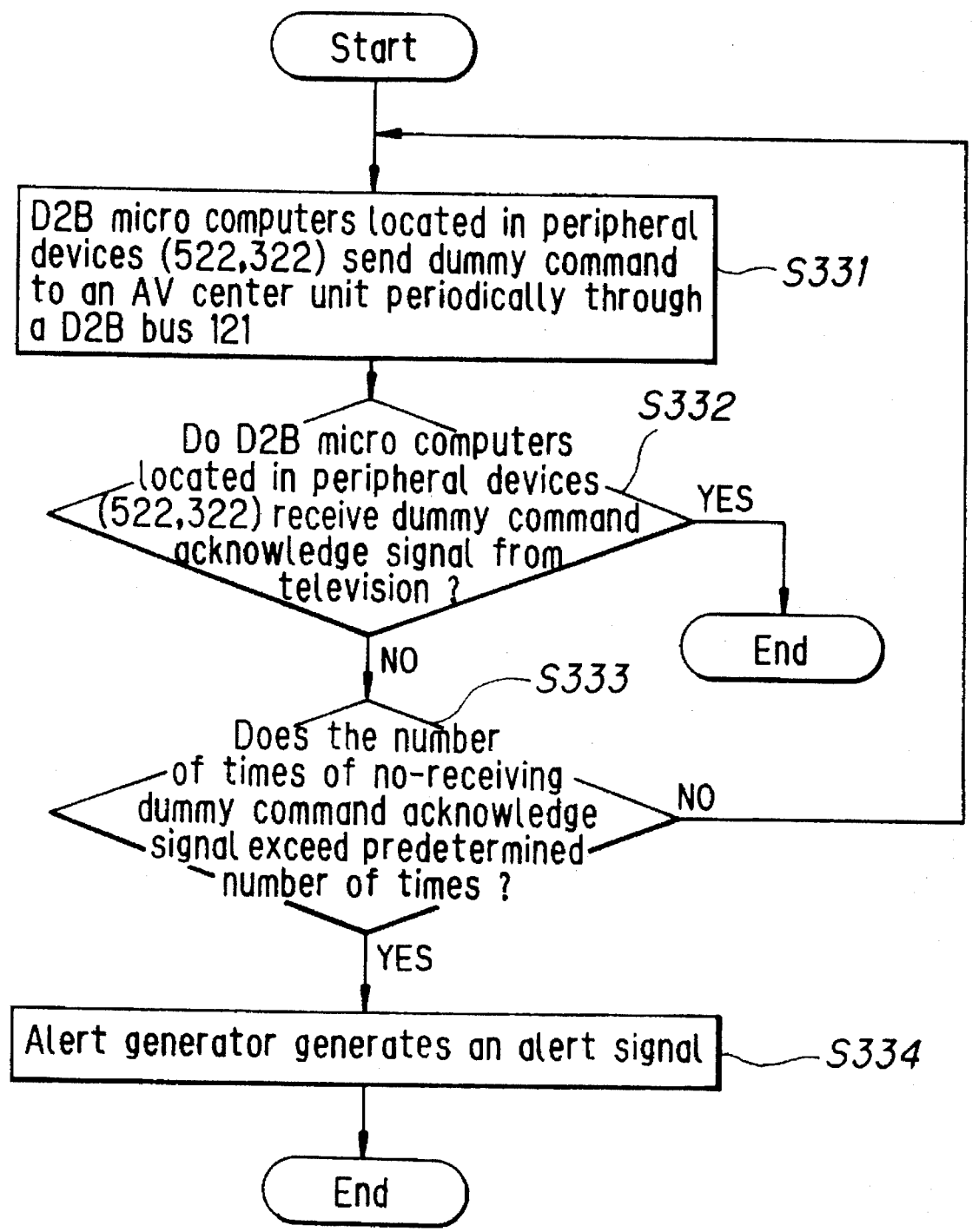
FIG. 22 is a view of the operation of the example modification shown in FIG. 21.

FIG. 22 is a view of the operation of the example shown in FIG. 21. The D2B microcomputer 52 in the laser disc player 50 periodically sends a dummy command to the television 1 via the D2B bus 121 (step S331). The dummy command is a command which is not detrimental to the operation of the television 1. If the D2B bus 121 running between the laser disc player 50 and the television 1 is connected properly, the dummy command is passed on to the communications buffer 94 for the television via the D2B bus 121. In response to this, the D2B microcomputer 92 transmits a confirmation of receipt command signal to the laser disc player 50 via the D2B bus 121. It is determined that the D2B bus is connected properly when it is confirmed by the D2B microcomputer 522 for the laser disc 50 that a command receipt confirmation signal has reached the communications buffer 524 (YES in step 332).

If the D2B bus between the laser disc player 50 and the television 1 is not connected correctly, the dummy command will not reach the communications buffer 94 for the television 1 via the D2B bus 121. It therefore follows that the command receival confirmation signal will not have reached the communications buffer 524 of the laser disc player 50 (NO in step 332). If the number of times that it is acknowledged that the command receiving confirmation signal for the dummy command is not present exceeds a predetermined number of times (YES in step S333), the D2B microcomputer 522 for the laser disc player 50 determines that the D2B control line 121 is not connected properly. The warning generator 526 will then generate a warning light or sound to indicate this (step S334).

The D2B microcomputer 322, communications buffer 324 and warning generator 326 for the VCR 30 are the same as the D2B microcomputer 522, communications buffer 524 and warning generator 526 for the laser disc player 50 and follow the same operation as that shown in the flowchart in FIG. 22.

For the case where a dummy command is transmitted from the laser disc player 50 to the television 1 an abnormality will be displayed even if the D2B bus between the VCR 30 and the television 1 is not connected or even if the D2B bus between the laser disc player 50 and the VCR 30 is not connected.

In the process in FIG. 22, rather than sending a dummy command from the television 1, dummy commands are instead sent from the audio visual equipment such as the laser disc player which is connected to the television 1. In this way, even if audio visual equipment is added or disconnected so as to change the construction of the overall system, it is not necessary to carry out a repeat system set up to look out for system abnormalities (i.e. the television 1 can deal with any kind of structure).

It would also be preferable for the television 1 to send dummy commands to the audio equipment such as the VCR 30 when the television understands the connection conditions for all of the audio visual equipment connected to the television 1.

Also, it is preferable to only send a dummy command when there is a request for a test from the user, rather than send one periodically. In this way the D2B bus can be used for another application.

Figure 23:
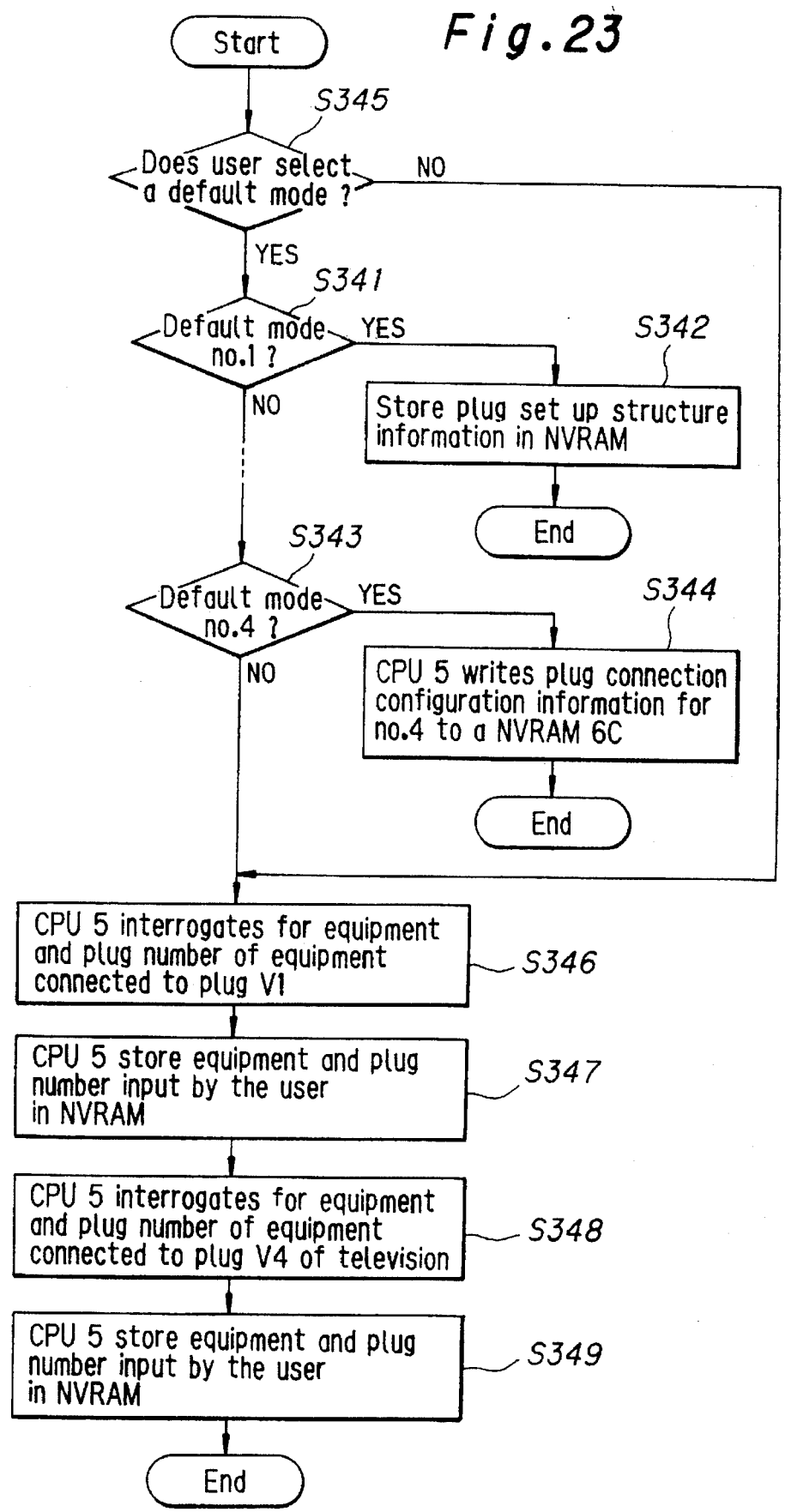
FIG. 23 is a flowchart of an initialization set-up process for the third embodiment of this invention.
Figure 24:
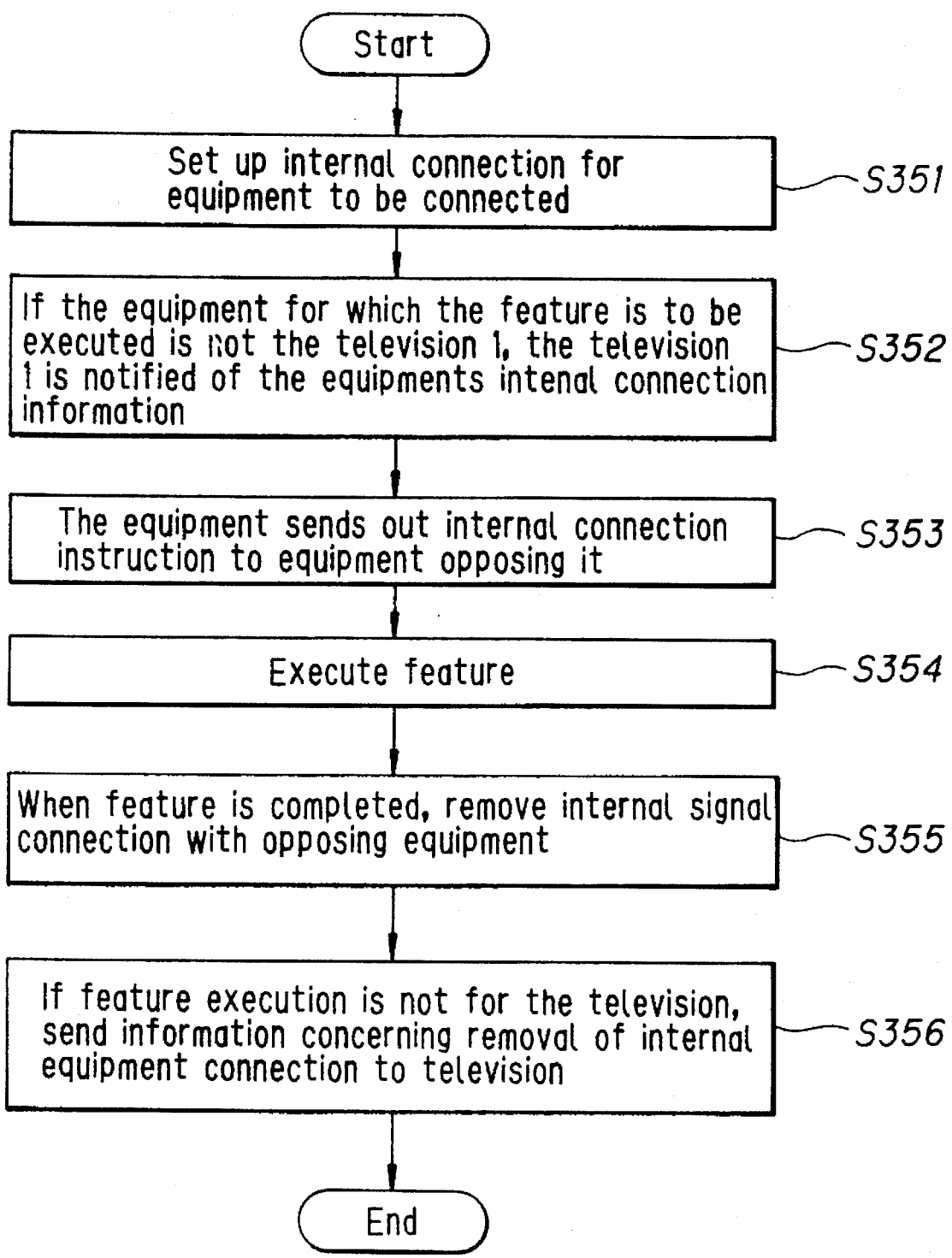
FIG. 24 is a flowchart showing an example of the operation at the time of an execution of a feature for this invention and corresponds with the initialization in FIG. 23.

FIG. 23 is a flowchart of an initialization set-up process for an embodiment of this invention. FIG. 24 is a flowchart showing an example of the operation at the time of an execution of a feature for this invention which corresponds with the initialization in FIG. 23. In the prior art, every time each feature (for example, a "one touch play" feature) is carried out a connection has to be made between the audio visual equipment i.e. signal connections have to be made between the sub-devices within each of the items of audio visual equipment which means that a large number of flow instructions are required to set up the bus 121 to do this, which makes the process complicated. So, in the embodiment for this invention in FIG. 23 and FIG. 24, the user will have pre-stored set-up information concerning the connections between the audio visual equipment (i.e. connections between one item of audio visual equipment and the next) and the television 1 at the time of initialization.

Connection instructions are therefore not output between the audio visual equipment when features are executed so that by executing signal connection instructions within the audio visual equipment, the program speed can be increased and the process program can be simplified.

The initialization set up operation will now be described with reference to FIG. 23. When the user selects default mode by using, for example, the remote controller 2 (YES in step 345), the CPU 5 belonging to the television 1 reads a plug connection structure from the NVRAM 6C in accordance with the default mode number selected by the user (steps S341 to S344).

When the user selects manual mode rather than selecting the default mode (NO in step 345), the CPU 5 for the television 1 interrogates the user to find out what equipment is connected to the plugs V1 to V4 and which number plug the equipment is connected to. Information concerning the equipment and plug numbers input by the user by using, for example, the remote controller 2 is then stored in the NVRAM 6C.

Next, the operation at the time of the execution of features will be described with reference to FIG. 24. First, an internal connection is set up for the equipment (the television 1, the VCR 30 or the laser disc player 50) for which the feature is to be executed (step S351). In the case where the equipment for which the feature is to be executed is not the television 1, the television 1 is notified of the equipments internal connection information (step S352). Next, the equipment sends an internal connection instruction to the equipment opposing it and the feature is executed (step S353 and step S354). The internal signal connection with the opposing equipment is then removed when the feature is completed (step S355). The television is also told of the removal of the internal connection when the feature execution does not occur within the television 1.

Figure 25:
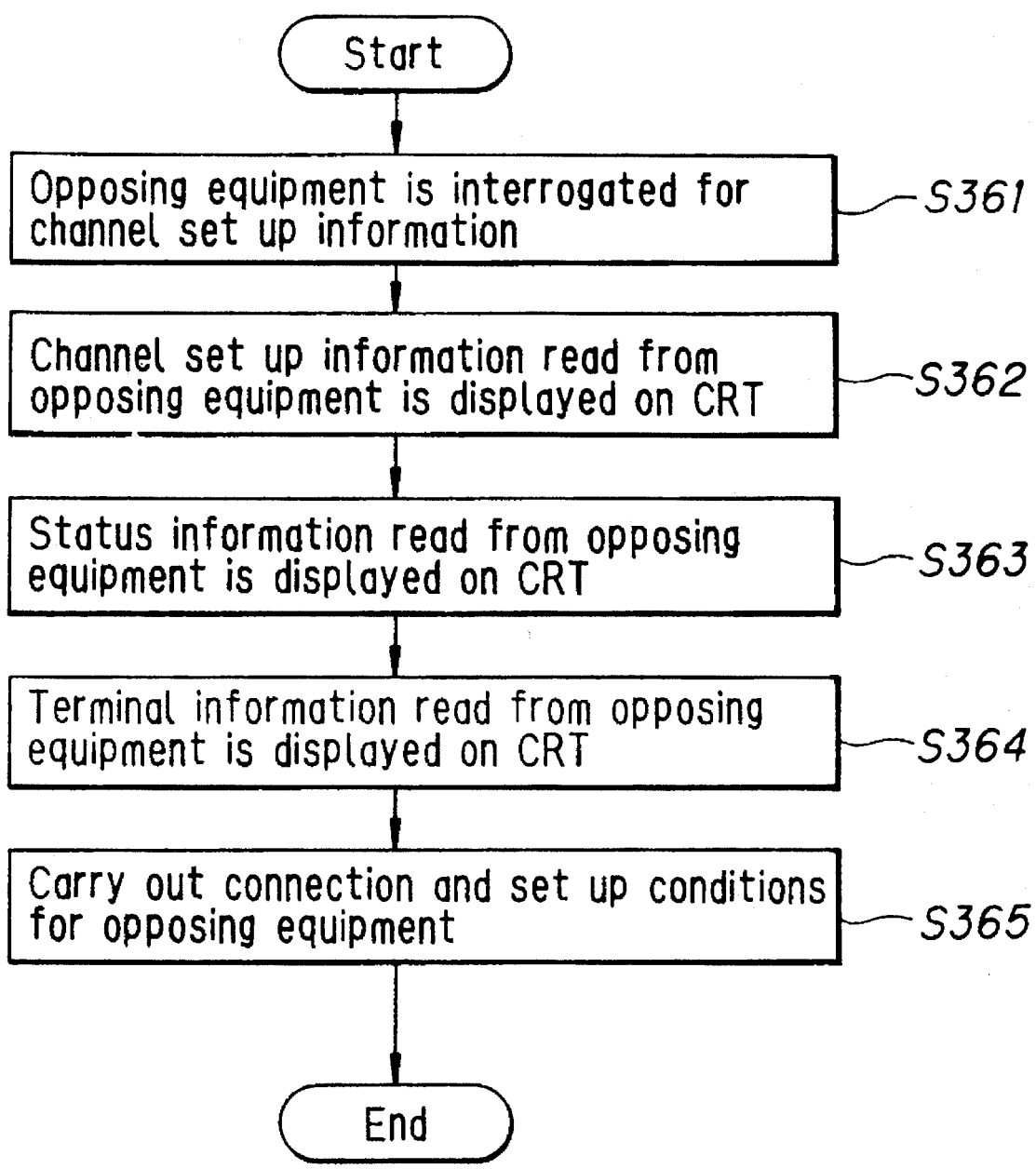
FIG. 25 is a flowchart of the set up process and diagnosis for the opposing (i.e. the other) item of equipment for an embodiment of the present invention.

FIG. 25 is a flowchart of the set up process and diagnosis for the opposing (i.e. the other) item of equipment for an embodiment of the present invention. FIG. 26 is a view of what is displayed on the CRT 113 from FIG. 3 at each step of the process in FIG. 25. Prior art audio visual equipment possessed a self analysis function but could not analyze the condition of other audio visual equipment via the audio-video bus and could not carry out the initialization set up process for other audio visual equipment. In order to achieve this, the user who bought the television and VCR would have had to set up the channels for the television and VCR or for every item of equipment. In the embodiment in FIG. 25, the channel set up and analysis can be carried out for the opposing equipment to evaluate the degree of user friendliness.

When explaining the embodiment in FIG. 25, first, the D2B communications processing microcomputer 109 for the television 100 interrogates the opposing equipment (for example, the VCR 30) via the D2B control line 121 for channel set-up information (step S361). Then, the microcomputer 109 displays the channel set-up information read from the opposing equipment on the CRT 113 via the picture display IC 114 in the manner shown in FIG. 26(a) (step S362).

Next, the D2B microcomputer 109 interrogates the opposing equipment (for example, the VCR 30) via the D2B control line 121 for conditions such as contrast, brightness and color conditions then displays this information read from the opposing equipment on the CRT 113 via the picture display IC 114 in the manner shown in FIG. 26(b). (step S363).

Then, the D2B microcomputer 109 interrogates the opposing equipment (for example, the VCR 30) via the D2B control line 121 for audio/video terminal information then displays this information read from the opposing equipment on the CRT 113 via the picture display IC 114 in the manner shown in FIG. 26(c). (step S364).

Next, the D2B microcomputer 109 displays an opposing equipment set up process menu like the one in FIG. 26(d) for setting up the opposing equipment (for example, the VCR 30) on the CRT 113 via the picture display IC 114. Then the set up information input via an item such as the remote controller 2 is sent to the opposing equipment (for example, the VCR 30) via the D2B control line 121 and the connection and set up conditions are carried out (step S365).

In the aforementioned example, the channel set up was carried out but the volume set up could be carried out in the same way.

Figure 27:
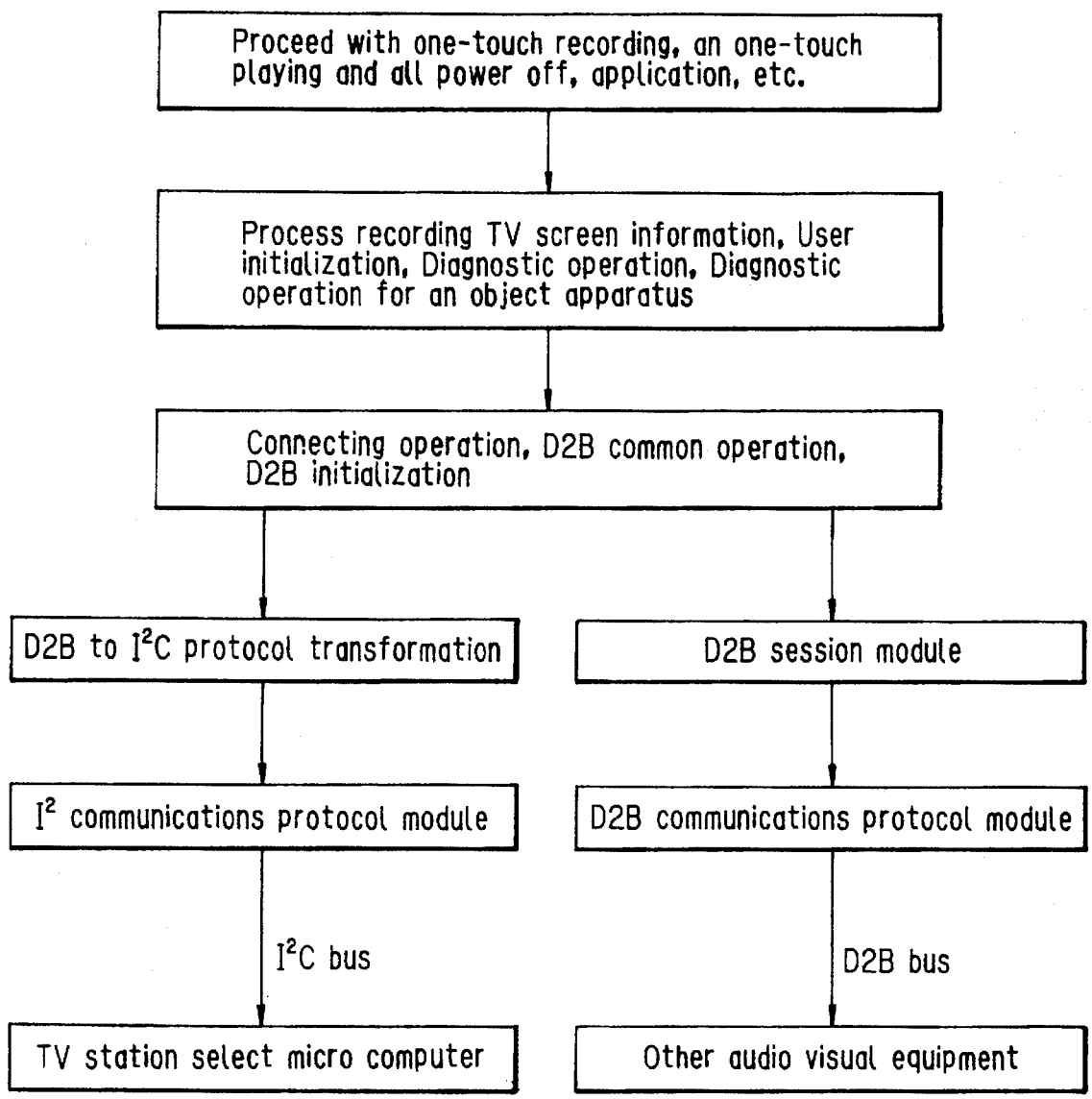
FIG. 27 is a block diagram showing the internal process structure for the D2B microcomputer 109.
Figure 28:
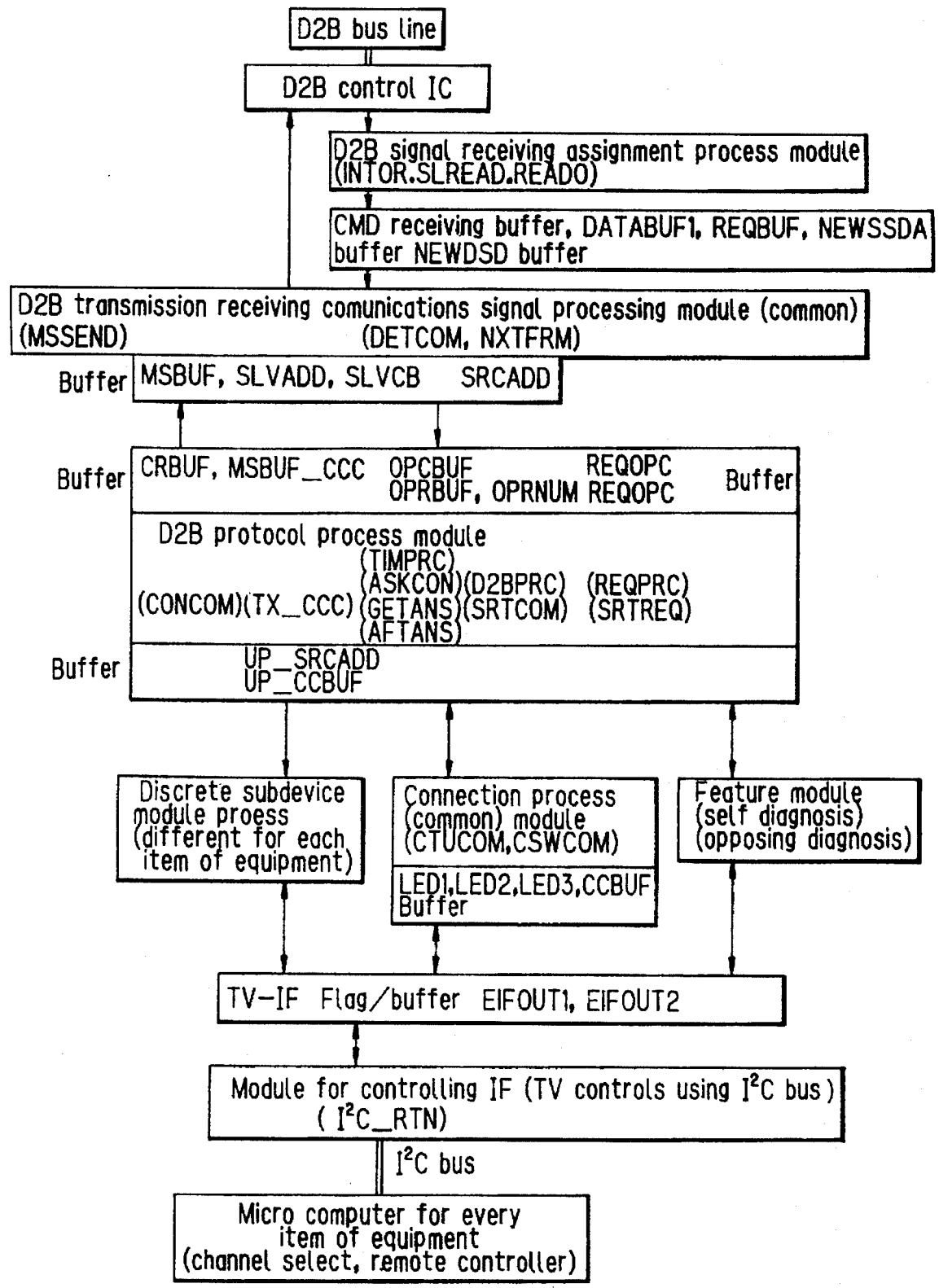
FIG. 28 is a block diagram showing the breakdown of the D2B module.
Figure 29:
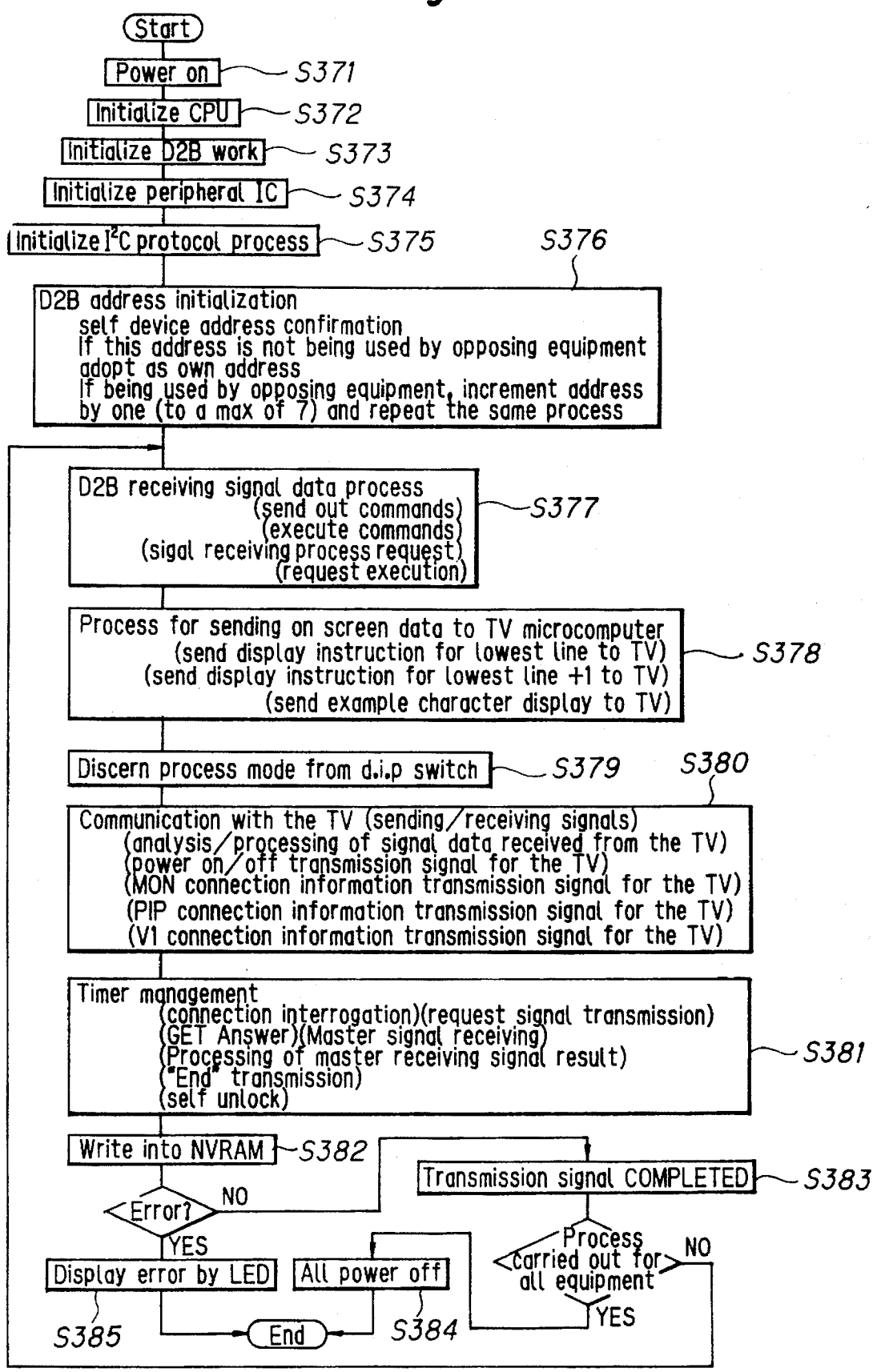
FIG. 29 is a flowchart showing the process for the D2B microcomputer 109.

FIG. 27 is a block diagram showing the internal process structure for the D2B microcomputer 109 in FIG. 3, FIG. 28 is a block diagram showing the breakdown of the D2B module and FIG. 29 is a flowchart showing the process for the D2B microcomputer 109. In FIG. 29, when the power is turned on (step S371), the microcomputer 109 initializes the CPU (step S372). The D2BWORK, which is a register in which initialization set up information related to the D2B processes is stored, is then initialized (step S373) and peripheral ICs such as the picture display IC 114 and the D2B communications processing IC 110 are also initialized (step S374). The bus protocol process for the I2C bus belonging to the internal bus is then initialized (step S375) and the address initialization is then carried out (step S376). This then completes the initialization of the D2B microcomputer 109.

Following this, the D2B microcomputer 109 carries out the D2B signal data receiving process (step S377) and the on screen display data is sent to the television controller CPU 104 (step S378). The process mode is then discerned from a d.i.p. switch (step S379) and the signal is transmitted and received between the television controller CPU (step S380).

The timer control to acquire connection interrogations and responses is carried out (step S382) and a message to say that the connection process for the audio visual equipment has been completed is then transmitted (step S383). The power for all of the equipment is then turned off (step S384) or an error is displayed by an LED at the front surface of the television 100 (step S385). The process in step 377 to step 385 is then repeated.

If there is a telephone with a modem arranged within the system in line with the D2B bus analysis of each of the processes in the audio/video equipment can be carried out remotely. This makes it much easier to carry out repair services. Also, as the initialization tests can now be carried out over a short period of time without the user being aware that they are taking place, the audio visual equipment can always be maintained under conditions which give maximum performance.

When carrying out the initialization connection set up process for the prior art, the user would set up the initialization connections between the items of audio visual equipment by operating keys on a remote controller or by operating the switches of a control means on the front panel while looking at an initialization connection set up picture displayed on the CRT. However, it is not easy to operate keys and switches while looking at a screen so that the initialization set up took a long time.

In the embodiment for this invention there is a transparent touch panel at the front surface of the CRT which can detect at which position it has been touched by the user.

The initialization set up can then be carried out simply by determining which transmission source and which receiving source the user wishes to have. Various methods for detecting which part of the panel has been touched can be adopted such as panels which detect shade differences in infra-red light caused by the touch of a finger and methods which detect changes in resistance of the part of the panel which is touched.

Figure 32:
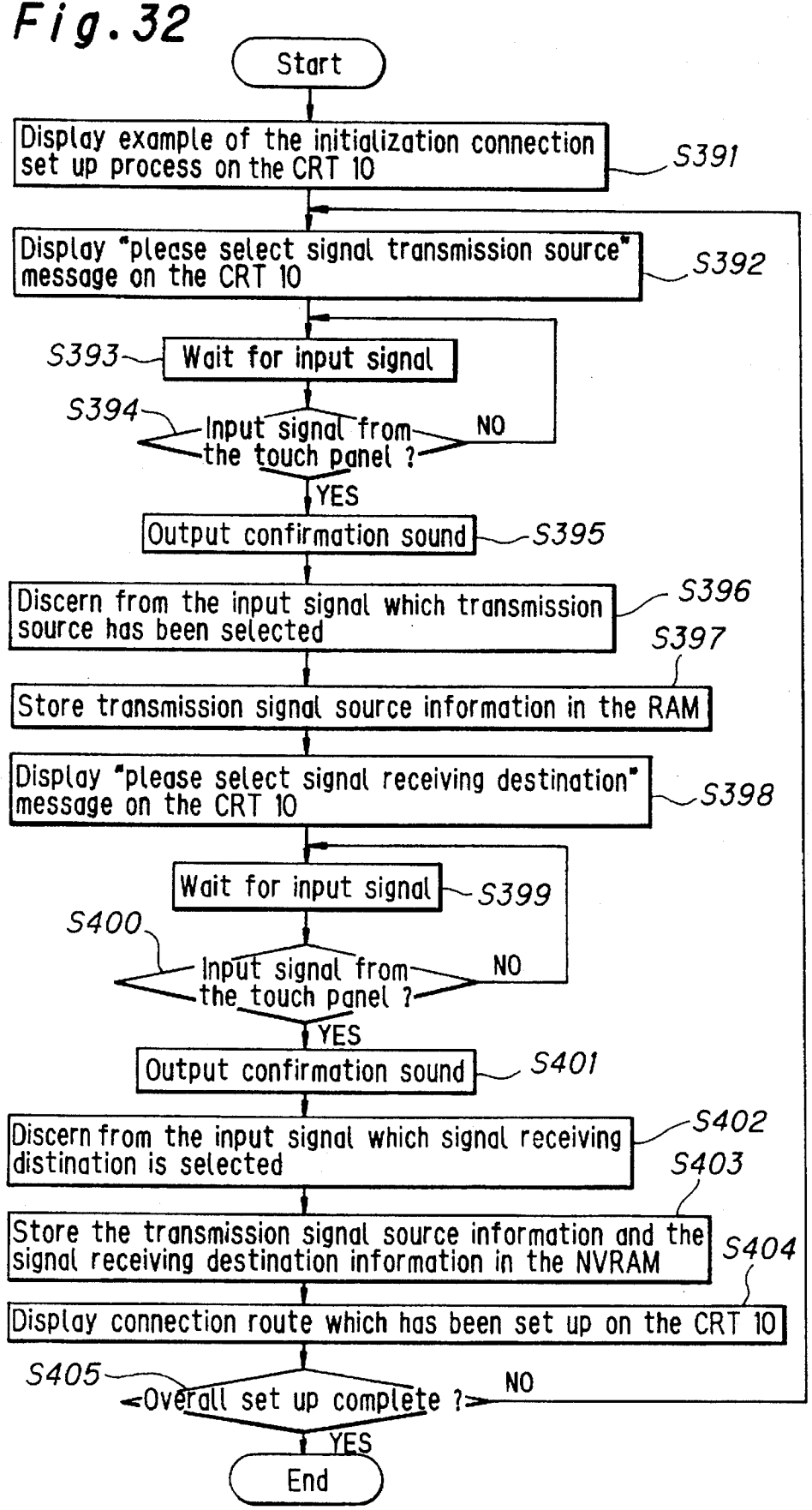
FIG. 32 is a flowchart showing an example of the connection set up process for the present invention.
Figure 33:
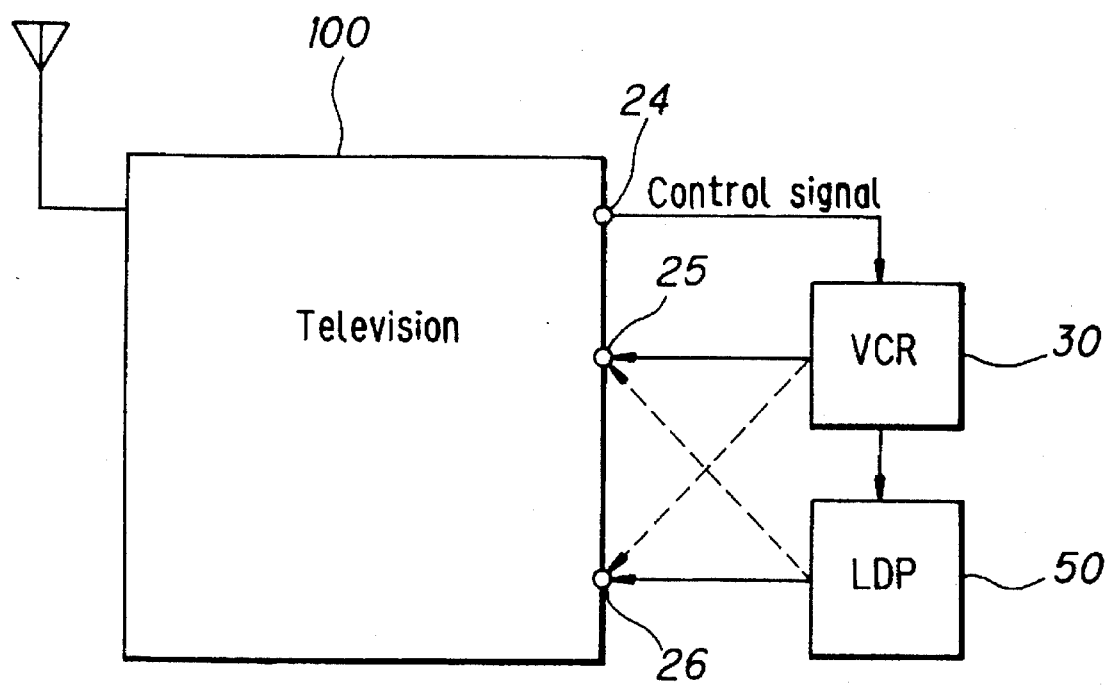
FIG. 33 is a block diagram showing an example structure of a conventional video system.
Figure 34:
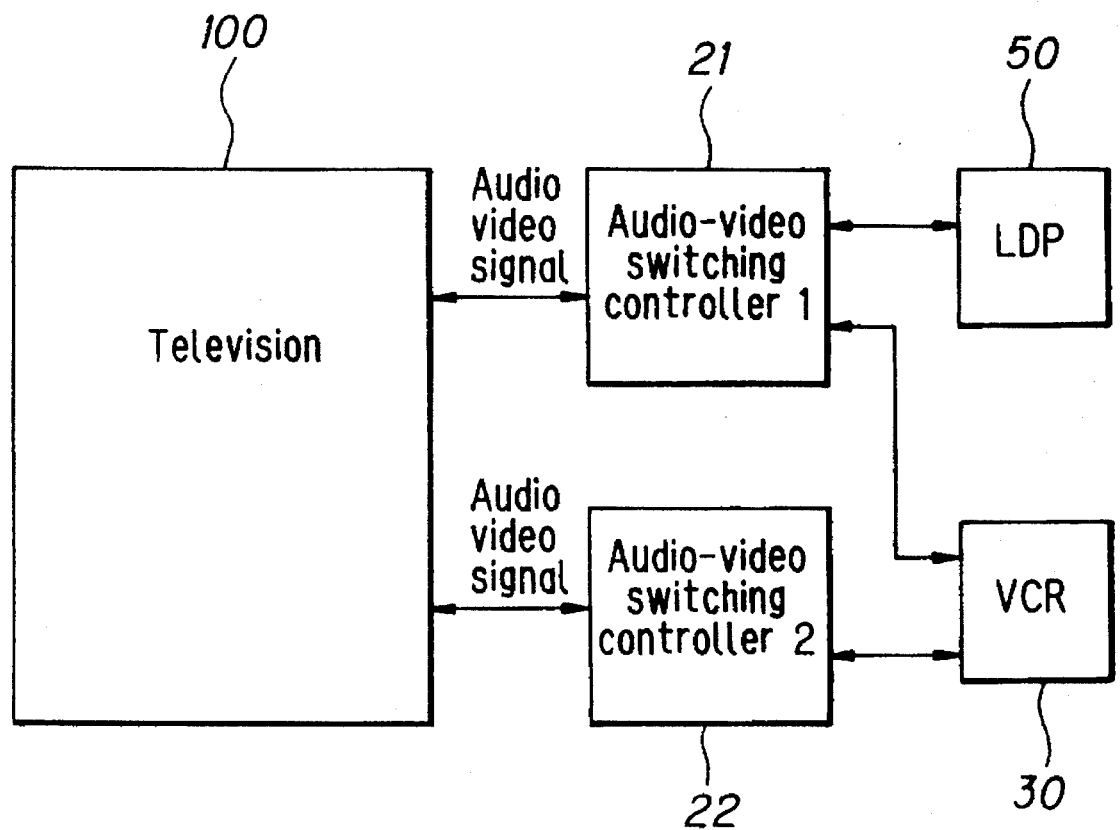
FIG. 34 is a block diagram showing an example of a conventional audio/video system.

FIG. 32 is a flowchart showing an example of the initialization connection set up process for when there is a touch panel at the front surface of the CRT 10. FIG. 30 and FIG. 31 are diagrams showing the contents displayed on the CRT 10 for the process in FIG. 32. First, the CPU 5 displays the picture shown in FIG. 30 on the CRT 10 (step S391) (i.e. the equipment which can be selected to be transmitted from and the equipment which can be selected to receive are displayed in the picture). Then, the CPU 5 displays a message to the effect of "please select signal transmission source" on the CRT 10 (step S392).

The CPU 5 then waits for an input from the user (step S393) so that when there is an input signal from the touch panel (YES in step S394) a confirmation sound (beep) is output (step S395). Then, when the CPU 5 has discerned from the input signal which transmission source has been selected (step S396), the transmission signal source information is stored in the RAM 6B (step S397).

Next, the CPU 5 displays a message to the effect of "please select signal receiving destination" on the CRT 10 (step S398). The CPU 5 then waits for an input from the user (step S399) so that when there is an input signal from the touch panel (YES in step S400) a confirmation sound (beep) is output (step S401). Then, when the CPU 5 has discerned from the input signal which signal receiving destination has been selected (step S402), the signal receiving destination information is stored in the RAM 6B and the aforementioned transmission signal source information and the signal receiving destination information are also then both stored in the NVRAM 6C (step S403). The CPU 5 then displays an arrow on the CRT 13, as shown in FIG. 31, to indicate which connection route has been set up (step S404). The process from step S392 to step S405 is then repeated until a set up complete input is put in by the user via an item such as the remote controller 2 (YES in step 405).

The example in FIGS. 30 to 32 relates to the initialization set up. However, the user operation could also be made easy for the case of feature execution simply by making the picture correspond to this application.

Also, this invention is by no means limited to audio visual equipment and would also be suitable for use with various other electronic equipment.

As described above, according to the present invention, there is provided an audio visual equipment with a digital bus system comprising: a CPU for outputting a control signal; controlling means for controlling one or more external apparatuses based on the control signal from the CPU; switching means for selecting one of the external apparatuses in order to receive an information signal from the selected external apparatus; detecting means for detecting the information signal received by the switching means; displaying means for displaying the information signal received by the switching means; and the control means and the switching means being controlled by the CPU. It follows that the user will be able to easily confirm the equipment connection conditions for the equipment without the user having to do any troublesome work.

There is also provided according to the present invention a method for initializing and confirming connection of a system comprising the steps of: showing a system connection and/or configuration model to the user; generating a test signal for confirming the model; and detecting the test signal. This means that connection conditions between other electronic equipment can be easily understood so that the connection set up and confirmation can easily be carried out for a large number of items of electronic equipment. This also eliminates the need for additional test signal generators and detectors for the connection confirmation, so that the connection confirmation can be carried out at a low cost.

Further, there is provided a method for initializing a system, comprising the steps of: sending a predetermined command via a digital bus line; going through predetermined processing steps for deciding a system status; and storing a system configuration in a non-volatile storage means. This will reduce the time for making a connection to a predetermined item of equipment. It also follows that when the user uses, for example, the remote controller to output a connection instruction, the user will be more at ease, as the connection is completed in a short period of time. The user can also set up the connection path easily as the connection path which is selected from the plurality of connection paths which is displayed can be memorized.

Also, as the connection path which was set up is stored in non-volatile memory, it is no longer necessary for the user to set up the connection paths one by one each time the power is turned on.

Further, when the control line for transmitting the signal for controlling the connection paths is incomplete, the user is made aware of this abnormality as the warning generator will generate a warning.

What is claimed is:

1. An audio visual equipment with a digital bus system comprising:
    a CPU for outputting a control signal;
    control means for controlling one or more external apparatuses based on said control signal from said CPU;
    switching means for selecting one of said external apparatuses in order to receive an information signal from the selected external apparatus;
    detecting means for detecting said information signal received by said switching means; and
    displaying means for displaying said information signal received by said switching means,
    wherein said control means and said switching means are controlled by said CPU, and
    wherein each of said external apparatuses connected to said switching means includes a signal generator for generating test signals.

2. An audio visual equipment as claimed in claim 1, wherein the information signal from the selected external apparatus is an audio and/or a video signal.

3. An audio visual equipment as claimed in claim 2, further comprising:
    a tuner for receiving high frequency signals and outputting audio and/or video signals;
    storage means for storing apparatus connection configuration data; and
    receiving means for receiving a remote control signal from an external remote controller for controlling operation and setting connection configuration of said digital bus system.

4. An audio visual equipment as claimed in claim 3, wherein said CPU receives test signal information from said connected apparatuses, controls said switching means for selecting suitable system information, and stores said apparatus connection configuration data in said storage means.

5. An audio visual equipment as claimed in claim 4, wherein said storage means is non-volatile, and said control means employs a domestic digital bus protocol.

6. An audio visual equipment as claimed in claim 2, further comprising:
    a bus controller for controlling a bus operation in said digital bus system; and
    buffer means for buffering data sent to or by said bus controller for controlling said digital bus system, wherein each of said external apparatuses includes bus communication means for communicating with said bus controller and communication buffer means for buffering data sent to or by said bus communication means.

7. An audio visual equipment as claimed in claim 6, wherein each of said external apparatuses includes a warning generator for giving a warning when the data located in said external apparatus indicates an error or abnormal situation.

8. An audio visual equipment as claimed in claim 3 further comprising a picture in picture circuit for performing picture in picture processing on a system configuration message to be displayed as a sub-picture.

9. An audio visual equipment as claimed in claim 1, wherein said displaying means displays a picture showing a plurality of connectable apparatuses in a format of a list of source apparatuses, a list of destination apparatuses and an indication of possible data flows.

10. A method for initializing and confirming connection of a system comprising the steps of:

showing a system connection and/or configuration model to the user;

generating a test signal for confirming said model; and detecting said test signal.

11. A method for initializing and confirming connection of a system as claimed in claim 10, wherein said model is user-amendable if said model does not meet user's requirements.

12. A method for initializing and confirming connection of a system as claimed in claim 10, wherein a picture of an abnormally connected portion and a suggested way of amending said abnormally connected portion are displayed if said test signal is not detected correctly.

13. A method for initializing and confirming connection of a system as claimed in claim 10, wherein after detecting said test signal, a different information signal is selected by sending a further control signal to a selecting means.

14. A method for initializing a system, comprising the steps of:

sending a predetermined command via a digital bus line;

going through predetermined processing steps for deciding a system status; and storing a system configuration in a non-volatile storage means, wherein said predetermined processing steps for deciding system status include sending a command by said digital bus to a predetermined address number, changing said address number to a new address if an acknowledgement signal is received from an apparatus, and if said acknowledgement signal is not received from an apparatus, assigning said new address to an apparatus not having an assigned address.

15. A method for initializing a system as claimed in claim 14, wherein in the absence of an acknowledgement signal, said system selects a non-receiving mode as a result of an error signal transmitted via said digital bus.

16. A method for initializing a system as claimed in claim 14, wherein if said predetermined processing steps for deciding a system status determine that the system status is abnormal, a warning signal is generated.

17. A method for initializing a system as claimed in claim 16, wherein abnormal status is determined when a central unit fails to receive a second predetermined command sent from a peripheral device in response to said predetermined command sent via said digital bus line.

18. A method for initializing a system as claimed in claim 17, including making the abnormal status determination a number of times as to whether said central unit has failed to receive said second predetermined command from said peripheral device.

* * * * *